(12) United States Patent
Kikuchi et al.

(10) Patent No.: US 9,452,653 B2
(45) Date of Patent: Sep. 27, 2016

(54) VEHICLE CONTROLLING APPARATUS AND METHOD

(71) Applicant: NISSAN MOTOR CO., LTD., Yokohama-shi, Kanagawa-ken (JP)

(72) Inventors: Hironobu Kikuchi, Isehara (JP); Katsuhiko Hirayama, Isehara (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 92 days.

(21) Appl. No.: 13/828,888

(22) Filed: Mar. 14, 2013

(65) Prior Publication Data

US 2013/0245888 A1 Sep. 19, 2013

(30) Foreign Application Priority Data

Mar. 15, 2012 (JP) ................................ 2012-058142
Mar. 15, 2012 (JP) ................................ 2012-058143
Mar. 23, 2012 (JP) ................................ 2012-066457

(51) Int. Cl.

| | |
|---|---|
| *B60G 17/015* | (2006.01) |
| *B60G 17/0195* | (2006.01) |
| *B60T 8/17* | (2006.01) |
| *B60T 8/1755* | (2006.01) |
| *B60W 10/04* | (2006.01) |
| *B60W 10/18* | (2012.01) |
| *B60W 10/22* | (2006.01) |

(Continued)

(52) U.S. Cl.
CPC ......... *B60G 17/016* (2013.01); *B60G 17/0195* (2013.01); *B60G 17/06* (2013.01); *B60T 8/17555* (2013.01); *B60W 10/04* (2013.01); *B60W 10/18* (2013.01); *B60W 30/025* (2013.01); *B60G 2400/102* (2013.01); *B60G 2500/10* (2013.01); *B60T 2260/06* (2013.01); *B60W 2510/18* (2013.01); *B60W 2510/22* (2013.01); *B60W 2520/00* (2013.01); *B60W 2710/0677* (2013.01); *B60W 2710/182* (2013.01)

(58) Field of Classification Search
None
See application file for complete search history.

(56) References Cited

U.S. PATENT DOCUMENTS 5,393,087 A * 2/1995 Taniguchi et al. ......... 280/6.158
5,532,921 A * 7/1996 Katsuda ......................... 701/37

(Continued)

FOREIGN PATENT DOCUMENTS

| JP | 3-276811 A | 12/1991 |
|---|---|---|
| JP | 07-117435 A | 5/1995 |

(Continued)

*Primary Examiner* — Fadey Jabr
*Assistant Examiner* — Kevin P. Mahne
(74) *Attorney, Agent, or Firm* — Foley & Lardner LLP

(57) ABSTRACT

A vehicle controlling apparatus includes: a vertical acceleration sensor configured to detect a vertical acceleration of a sprung mass; a power-source attitude controller configured to compute a power-source attitude control amount for a driving force outputted from a power source, the control amount making the acceleration detected by the vertical acceleration sensor an appropriate acceleration for attaining a target sprung-mass state, and to control the power source based on the power-source attitude control amount; a stroke sensor configured to detect a stroke speed of a shock absorber; and a friction-brake attitude controller configured to compute a brake attitude control amount for a braking force outputted from a friction brake, the control amount making the stroke speed detected by the stroke sensor an appropriate stroke speed for attaining a target sprung-mass state, and to control the friction brake based on the brake attitude control amount.

20 Claims, 14 Drawing Sheets

(51) Int. Cl.
  *B60G 17/016* (2006.01)
  *B60G 17/06* (2006.01)
  *B60W 30/02* (2012.01)

(56) References Cited

U.S. PATENT DOCUMENTS

| | | | |
|---|---|---|---|
| 6,030,056 A * | 2/2000 | Sawada | B60T 8/00 |
| | | | 303/113.5 |
| 6,285,935 B1 | 9/2001 | Murata | |
| 6,366,841 B1 * | 4/2002 | Ohsaku | 701/37 |
| 6,593,849 B2 * | 7/2003 | Chubb | B60R 16/0233 |
| | | | 180/172 |
| 9,120,469 B2 | 9/2015 | Katsuyama | |
| 2006/0170283 A1 * | 8/2006 | Alvarez et al. | 303/155 |
| 2007/0213898 A1 * | 9/2007 | Saito et al. | 701/36 |
| 2008/0009992 A1 * | 1/2008 | Izawa et al. | 701/37 |
| 2008/0249690 A1 * | 10/2008 | Matsumoto et al. | 701/48 |
| 2009/0079145 A1 * | 3/2009 | Inoue et al. | 280/5.515 |
| 2009/0112402 A1 * | 4/2009 | Furuichi et al. | 701/38 |
| 2009/0132121 A1 * | 5/2009 | Furuichi et al. | 701/37 |
| 2009/0248247 A1 * | 10/2009 | Furuichi et al. | 701/37 |
| 2011/0160974 A1 * | 6/2011 | Fukuda et al. | 701/70 |
| 2011/0172872 A1 * | 7/2011 | Takahashi et al. | 701/29 |
| 2011/0213527 A1 * | 9/2011 | Itabashi et al. | 701/37 |
| 2011/0266760 A1 * | 11/2011 | Itabashi | 280/5.507 |
| 2012/0101691 A1 * | 4/2012 | Otsuka et al. | 701/48 |
| 2012/0193889 A1 * | 8/2012 | Harrison | B60T 7/20 |
| | | | 280/423.1 |
| 2013/0080013 A1 * | 3/2013 | Kobayashi et al. | 701/70 |
| 2013/0116874 A1 * | 5/2013 | Ichinose et al. | 701/22 |
| 2014/0309902 A1 * | 10/2014 | Katsuyama | B60T 8/1755 |
| | | | 701/70 |

FOREIGN PATENT DOCUMENTS

| | | |
|---|---|---|
| JP | 7-228114 A | 8/1995 |
| JP | 2001-47833 A | 2/2001 |
| JP | 2007-137107 A | 6/2007 |
| JP | 2009-273275 A | 11/2009 |
| JP | 2011-223691 A | 11/2011 |
| JP | 2012-30760 A | 2/2012 |
| WO | WO 2013/069126 A1 | 5/2013 |

\* cited by examiner

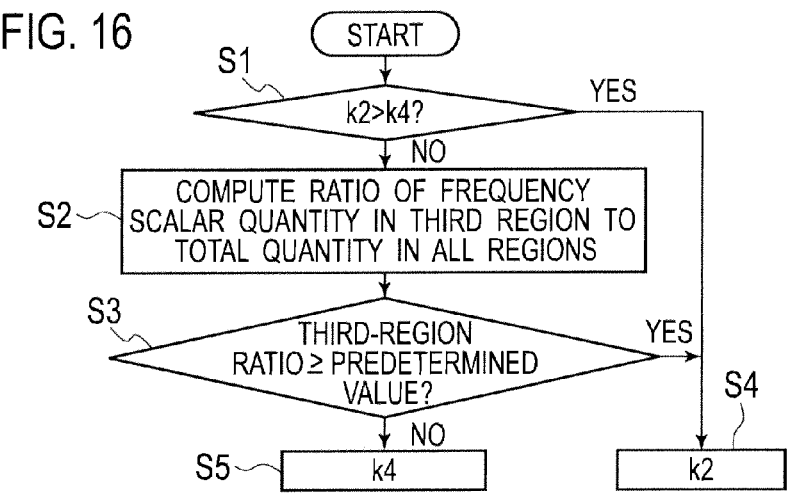
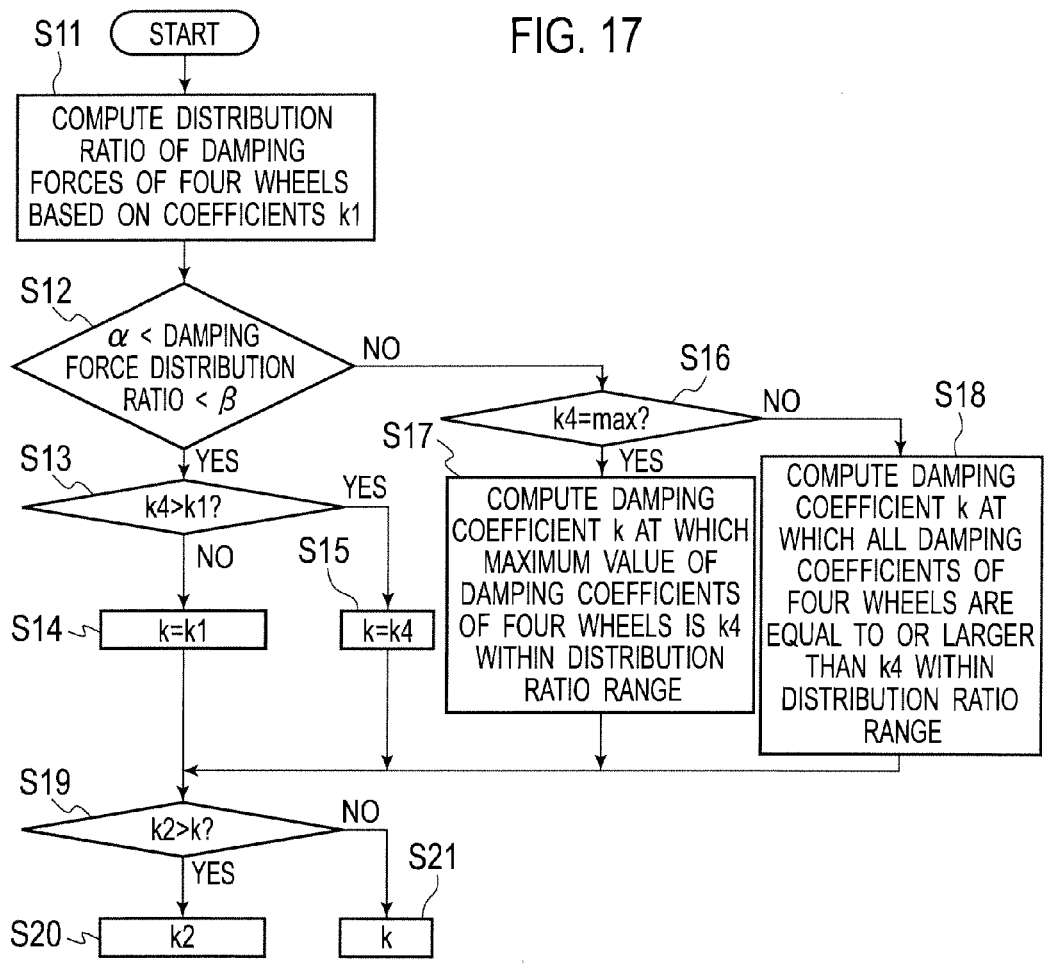

VEHICLE CONTROLLING APPARATUS AND METHOD

TECHNICAL FIELD

The present invention relates to an apparatus and method for controlling the status of a vehicle.

BACKGROUND

Japanese Patent Application Publication Nos. 2011-223691 and Hei 7-117435 disclose techniques regarding an apparatus for controlling a vehicle. Specifically, JP-A 2011-223691 discloses a technique for controlling vehicle's vibrations by use of a driving force; JP-A Hei 7-117435 discloses a technique for controlling the attitude of a vehicle by use of a suspension control device capable of changing its damping force.

SUMMARY

However, it is difficult to sufficiently suppress the vibrations by use of only the vibration suppression control using a driving force.

Moreover, when the vehicle's attitude is controlled only by the damping force of a shock absorber, a large damping force is likely to be set, giving the occupant discomfort when high-frequency vibrations are inputted from the road surface.

The present invention has a first objective of providing a vehicle controlling apparatus and method capable of suppressing vehicle vibrations.

The present invention also has a second objective of providing a vehicle controlling apparatus and method capable of controlling the vehicle attitude while mitigating discomfort experienced by the occupant.

To achieve the first objective above, a vehicle controlling apparatus according to a first aspect of the present invention comprises: a vertical acceleration sensor configured to detect a vertical acceleration of a sprung mass; a power-source attitude controller configured to compute a power-source attitude control amount for a driving force outputted from a power source, the control amount making the acceleration detected by the vertical acceleration sensor an appropriate acceleration for attaining a target sprung-mass state, and to control the power source based on the power-source attitude control amount; a stroke sensor configured to detect a stroke speed of a shock absorber; and a friction-brake attitude controller configured to compute a brake attitude control amount for a braking force outputted from a friction brake, the control amount making the stroke speed detected by the stroke sensor an appropriate stroke speed for attaining a target sprung-mass state, and to control the friction brake based on the brake attitude control amount.

To achieve the first objective above, a vehicle controlling method according to a second aspect of the present invention causes a controller to: compute a power-source attitude control amount for a driving force outputted from a power source, the control amount making a vertical acceleration of a sprung mass an appropriate sprung-mass vertical acceleration for attaining a target sprung-mass state, and control the driving force of the power source based on the power-source attitude control amount; and compute a brake attitude control amount for a braking force of a friction brake, the control amount making a stroke speed of a shock absorber an appropriate stroke speed for attaining at least one of a target sprung-mass state and a target unsprung-mass state, and control the braking force of the friction brake based on the brake attitude control amount.

To achieve the second objective above, a vehicle controlling apparatus according to a third aspect comprises: a vertical acceleration sensor configured to detect a vertical acceleration of a sprung mass; a power-source attitude controller configured to compute a power-source attitude control amount for a driving force outputted from a power source, the control amount making the acceleration detected by the vertical acceleration sensor an appropriate acceleration for attaining a target sprung-mass state, and to control the power source based on the power-source attitude control amount; a stroke sensor configured to detect a stroke speed of a damping-force-variable shock absorber; and a damping-force controller configured to compute a control amount for a damping force of the damping-force-variable shock absorber, the control amount making the stroke speed detected by the stroke sensor an appropriate stroke speed for attaining at least one of a target sprung-mass state and a target unsprung-mass state, and to control the damping-force-variable shock absorber based on the damping force control amount.

To achieve the second objective above, a vehicle controlling method according to a fourth aspect of the present invention causes a controller to: compute a power-source attitude control amount for a driving force outputted from a power source, the control amount making a vertical acceleration of a sprung mass an appropriate sprung-mass vertical acceleration for attaining a target sprung-mass state, and control the driving force of the power source based on the power-source attitude control amount; and compute a control amount for a damping force of a damping-force-variable shock absorber, the control amount making a stroke speed of the damping-force-variable shock absorber an appropriate stroke speed for attaining at least one of a target sprung-mass state and a target unsprung-mass state, and control the damping force of the damping-force-variable shock absorber based on the damping force control amount.

To achieve the second objective above, a vehicle controlling apparatus according to a fifth aspect of the present invention comprises: a plurality of actuators configured to perform vibration suppression control of a sprung mass; a stroke sensor configured to detect a stroke speed of a shock absorber; and a plurality of actuator attitude controllers configured to control corresponding actuators so that the stroke speed detected by the stroke sensor becomes an appropriate stroke speed for attaining a target sprung-mass state.

To achieve the second objective above, a vehicle controlling method according to a sixth aspect of the present invention causes: a sensor to detect a stroke speed of a shock absorber; and controllers to control a plurality of actuators performing sprung-mass vibration suppression control so that the stroke speed detected by the sensor becomes an appropriate stoke speed for attaining a target sprung-mass state.

BRIEF DESCRIPTION OF DRAWINGS

FIG. 16 is a flowchart showing damping coefficient arbitration processing performed in Standard mode in Embodiment 1.

FIG. 17 is a flowchart showing damping coefficient arbitration processing performed in Sports mode in Embodiment 1.

DESCRIPTION OF EMBODIMENTS

[Embodiment 1]

Figure 1:
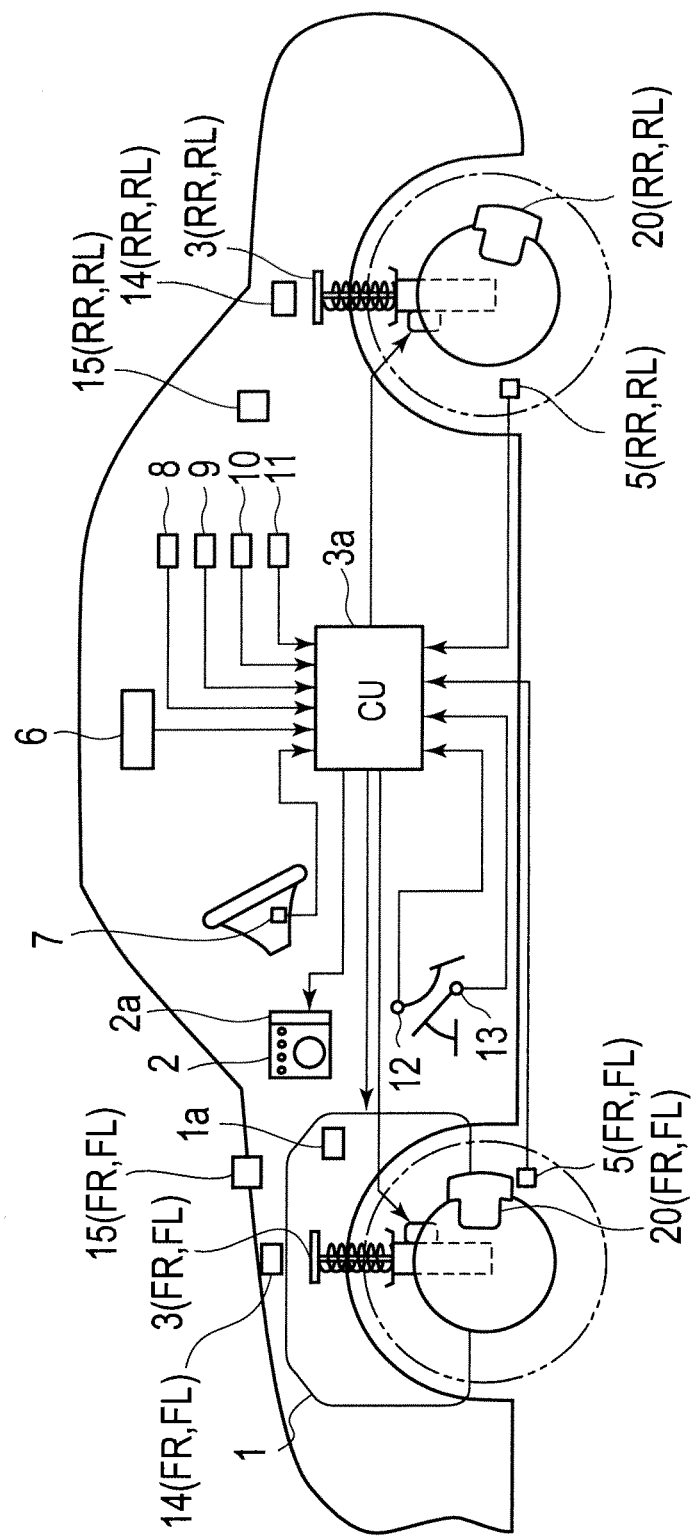
FIG. 1 is a system schematic diagram illustrating a vehicle controlling apparatus of Embodiment 1.

FIG. 1 is a schematic system diagram illustrating a vehicle controlling apparatus of Embodiment 1. The vehicle has an engine 1 as a power source, brakes 20 configured to generate, for respective wheels, a braking torque by a friction force (hereinbelow, when the brakes 20 are to be addressed individually, they are referred to as a front right wheel brake 20FR, a front left wheel brake 20FL, a rear right wheel brake 20RR, and a rear left wheel brake 20RL), and shock absorbers (S/As) 3 provided between the vehicle body and the respective wheels and capable of performing control using a variable damping force (hereinbelow, when the shock absorbers 3 are to be addressed individually, they are referred to as a front right wheel S/A 3FR, a front left wheel S/A 3FL, a rear right wheel S/A 3RR, and a rear left wheel S/A 3RL).

The engine 1 has an engine controller 1a (a power-source controller) configured to control a torque to be outputted from the engine 1. The engine controller 1a controls the operation behavior of the engine 1 (such as the engine speed and the engine output torque) as desired, by controlling the position of the throttle valve, the amount of fuel consumption, an ignition timing, and the like of the engine 1. The brakes 20 generate braking torques based on the hydraulic pressure supplied by a brake controlling unit 2 capable of controlling the pressure of the brake fluid for each wheel according to the traveling states. The brake controlling unit 2 has a brake controller 2a configured to control the braking torques generated by the brakes 20. The brake controller 2a generates a desired hydraulic pressure for the brakes 20 of the respective wheels through opening and closing operations of multiple electromagnetic valves, using a master cylinder pressure generated by brake pedaling of the driver or a pump pressure generated by an incorporated motor drive pump as its hydraulic pressure source.

The S/As 3 are each a damping-force generating device configured to damp the elastic motion of a coil spring provided between an unsprung mass (such as axles and wheels) and a sprung mass (such as the vehicle body) of the vehicle. The S/A 3 is configured to be able to change the damping force through operations of the actuators. The S/A 3 has a cylinder in which fluid is enclosed, a piston stroking inside this cylinder, and an orifice controlling the piston moving in the fluid between upper and lower fluid chambers. The piston has multiple orifices having different orifice sizes, and an orifice appropriate for a control instruction received is selected from the multiple orifices when the S/A 3 is actuated. Thus a damping force according to the size of the selected orifice can be generated. For example, when the orifice size is small, the movement of the piston is restricted more to make the damping force large; when the orifice size is large, the movement of the piston is restricted less to make the damping force small.

Note that the way of changing the damping force is not limited to selecting the orifice size. Alternatively, for example, the damping force may be changed by controlling the position of an electromagnetic control valve located on a communication channel formed between the upper and lower side of the piston to allow fluid communication. The S/As 3 have an S/A controller 3a (a damping-force controller) configured to control the damping force of each of the S/As 3 through operation of the orifice size of the S/As 3.

The vehicle also has wheel speed sensors 5 each configured to detect the wheel speed of its corresponding wheel, an integrated sensor 6 configured to detect a longitudinal acceleration, a yaw acceleration, and a lateral acceleration acting on the center of gravity of the vehicle, a steer-angle sensor 7 configured to detect a steer angle which indicates the amount of steering inputted by the driver, a vehicle speed sensor 8 configured to detect the speed of the vehicle, an engine torque sensor 9 configured to detect an engine torque, an engine speed sensor 10 configured to detect the speed of the engine, a master pressure sensor 11 configured to detect a master cylinder pressure, a brake switch 12 configured to output an on-state signal when the brake pedal is operated, an accelerator position sensor 13 configured to detect the position of the accelerator pedal, stroke sensors 14 (a front right wheel stroke sensor 14FR, a front left wheel stroke sensor 14FL, a rear right wheel stroke sensor 14RR, and a rear left wheel stroke sensor 14RL) provided on the sprung-mass side near the respective S/As 3 for the respective wheels to detect the stroke speeds of the S/As 3, and vertical acceleration sensors 15 (a front right wheel vertical acceleration sensor 15FR, a front left wheel vertical acceleration sensor 15FL, a rear right wheel vertical acceleration sensor 15RR, and a rear left wheel vertical acceleration sensor 15RL) provided on the sprung-mass side near the respective S/As 3 for the respective wheels to detect the vertical accelerations of the sprung mass. Signals from these various sensors are inputted to the engine controller 1a, the brake controller 2a, and the S/A controller 3a when needed. Note that the location of the integrated sensor 6 is not limited to the center of gravity of the vehicle, and may be located at any other position as long as the integrated sensor 6 can estimate various values at the center of gravity. In addition, the integrated sensor 6 does not have to have an integrated configuration, and may have individual configurations for detecting the yaw acceleration, the longitudinal acceleration, and the lateral acceleration.

(Overall Configuration of the Vehicle Controlling Apparatus)

In the vehicle controlling apparatus of Embodiment 1, three actuators are used to control vibrations generated in the sprung mass. In this vibration control, the controls of the sprung-mass state performed by these actuators interfere with each other. In addition, since an element controllable by the engine 1, an element controllable by the brake 20, and an element controllable by the S/As 3 are different, how these elements should be combined to be controlled is another problem.

For example, the brakes 20 can control the bounce motion and the pitch motion, but controlling both of these motions at the same time tends to cause the driver to experience a strong deceleration feel and thus discomfort. The S/As 3 can control all the roll motion, bounce motion, and pitch motion. However, if the S/As 3 perform a wide-range control on these motions, the manufacturing cost for the S/A 3 increases. Moreover, a large damping force tends to be set, making it likely for high-frequency vibrations to be inputted from the road surface. This gives the driver discomfort, too. In other words, the following tradeoff relation exists: control by the brake 20 does not lower the high-frequency vibration characteristics but increases a deceleration feel, while control by the S/A 3 does not increase the deceleration feel but causes high-frequency vibrations to be inputted.

To solve this, these problems are evaluated comprehensively so that the vehicle controlling apparatus of Embodiment 1 may achieve a control configuration which makes use of the actuators' advantages in the control performances, and at the same time, compensates for each other's disadvantages. To implement such a vehicle controlling apparatus which is excellent in its damping ability, yet can be manufactured inexpensively, the overall control system is constructed taking the following points mainly into consideration.

(1) Decrease the amount of control performed by the S/As 3 by preferentially causing the engine 1 and the brake 20 to perform control (2) Resolve the deceleration feel caused by control by the brakes 20 by making the brakes 20 control only the pitch motion (3) Limit the amount of control outputted by the engine 1 and the brakes 20 to less than what they can actually output, so as to mitigate the discomfort caused by their control, while reducing the load on the S/As 3

(4) In the sprung-mass control performed by the S/As 3, additionally introduce scalar control (frequency-sensitive control) to handle input of high-frequency vibrations which is hard for vector control, such as skyhook control, to handle (5) Provide an appropriate control mode which is in accordance with traveling states, by appropriately selecting the control mode achieved by the S/A 3 according to the traveling states These are the outline of the overall control system configured in the embodiment. How these points are achieved is described sequentially below.

Figure 2:
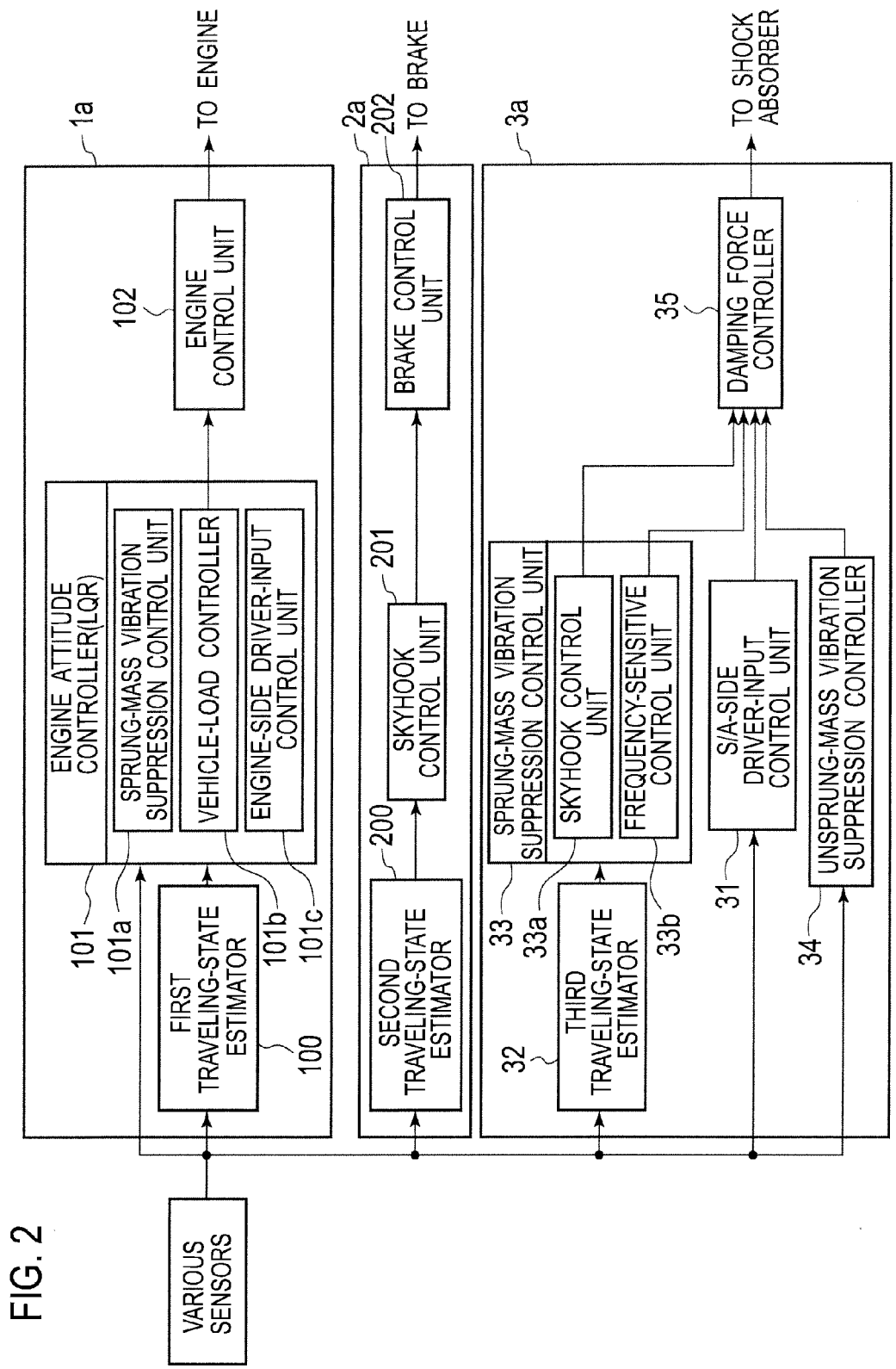
FIG. 2 is a control block diagram illustrating a control configuration of the vehicle controlling apparatus of Embodiment 1.

FIG. 2 is a control block diagram illustrating the control configuration of the vehicle controlling apparatus of Embodiment 1. The vehicle controlling apparatus of Embodiment 1 has three controllers: the engine controller 1a, the brake controller 2a, and the S/A controller 3a. The engine controller 1a has a feedback control system based on the vertical accelerations, and the S/A controller 3a and the brake controller 2a each have a feedback control system based on the stroke speeds.

Although the configuration of Embodiment 1 has three controllers, the present invention is not particularly limited to this. For example, these controllers may be integrated into a single controller. The configuration of Embodiment 1 has three controllers because it is supposed that the vehicle controlling apparatus of Embodiment 1 is implemented by using the engine controller and brake controller of an existing vehicle as they are and additionally installing the S/A controller 3a.

(Configuration of the Engine Controller)

The engine controller 1a performs feedback control based mainly on the vertical accelerations of the sprung mass detected by the vertical acceleration sensors 15. The engine controller 1a has a first traveling-state estimator 100 configured to estimate a pitch rate used by a sprung-mass vibration suppression control unit 101a to be described later, an engine attitude controller 101 configured to compute an engine attitude control amount, which is used as an engine torque instruction, and an engine control unit 102 configured to control the operating state of the engine 1 based on the engine attitude control amount computed by the first traveling-state estimator 100. Although the estimation processing performed by the first traveling-state estimator 100 calculates, based on the side view model, a pitch rate from the difference between the vertical accelerations at the front and at the rear, the present invention is not particularly limited to this. The estimation processing may be performed using a different model.

The engine attitude controller 101 includes a sprung-mass vibration suppression control unit 101a configured to compute a sprung-mass control amount for suppressing the bounce motion and the pitch motion, a vehicle-load controller 101b configured to compute a control amount for suppressing fluctuations in the vehicle load between the front wheels and the rear wheels, and an engine-side driver-input control unit 101c configured to compute yaw-response control amount suited to the vehicle behavior that the driver wants accomplished, based on signals from the sensors such as the steer-angle sensor 7 and the vehicle-speed sensor 8. The engine attitude controller 101 computes, through optimum control (LQR), an engine attitude control amount which is the minimum control amount of the control amounts computed by these controllers, and outputs the final engine attitude control amount to the engine controller 102. Since the engine 1 thus suppresses the bounce motion and the pitch motion, the damping force control amount for the S/As 3 can be reduced, which can contribute to avoiding lowering the high-frequency vibration characteristics. Further, since the S/As 3 can focus on suppressing the roll motion, the roll motion can be suppressed effectively.

(Configuration of the Brake Controller)

The brake controller 2a includes a second traveling-state estimator 200 configured to estimate a pitch rate based on the stroke speeds detected by the stroke sensors 14, a skyhook control unit 201 (to be described in detail later) configured to compute a brake attitude control amount which is based on skyhook control, from the pitch rate estimated by the second traveling-state estimator 200, and a brake controller 202 configured to control the braking torque from each brake 20 based on the brake attitude control amount computed by the skyhook control unit 201. Since the brakes 20 suppress the pitch motion, the damping force control amount for the S/As 3 can be reduced, which can contribute to avoiding lowering the high-frequency vibration characteristics. Further, since the S/As 3 can focus on suppressing the roll motion, the roll motion can be suppressed effectively.

(Configuration of the S/A Controller)

The S/A controller 3a includes a driver-input control unit 31 configured to perform driver-input control by calculating a shock-absorber attitude control amount for attaining a desired vehicle attitude, based on driver's operations (such as a steering operation, an accelerator operation, and a brake-pedaling operation), a third traveling-state estimator 32 configured to estimate traveling states based on detection values from the various sensors (mainly the stroke speeds detected by the stroke sensors 14) a sprung-mass vibration suppression control unit 33 configured to control the vibrations of the sprung mass by calculating a sprung-mass vibration suppression control amount based on the estimated traveling states, an unsprung-mass vibration suppression control unit 34 configured to control the vibrations of the unsprung mass by calculating an unsprung-mass vibration suppression control amount based on the estimated traveling states, and a damping-force controller 35 configured to perform damping-force control for the S/As 3 by determining a dumping force to be set for the S/A 3 based on: the shock-absorber attitude control amount outputted from the driver-input control unit 31, the sprung-mass vibration suppression control amount outputted from the sprung-mass vibration suppression control unit 33, and the unsprung-mass vibration suppression control amount outputted from the unsprung-mass vibration suppression control unit 34.

Figure 3:
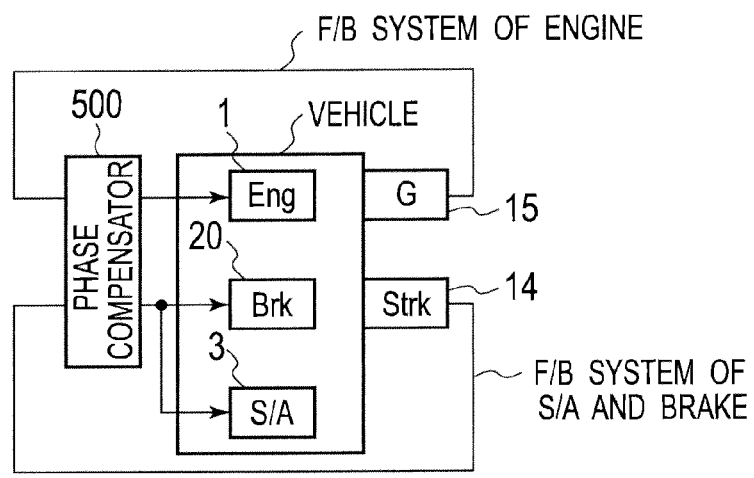
FIG. 3 is a conceptual diagram illustrating the configuration of feedback control systems of Embodiment 1.

In Embodiment 1, as described above, the feedback control system of the engine 1 uses the vertical acceleration sensors 15, while those of the brake 20 and the S/As 3 use the stroke sensors 14. FIG. 3 is a conceptual diagram illustrating the configurations of the feedback control systems of Embodiment 1.

In Embodiment 1, it is assumed that, compared to the S/As 3 and the brakes 20, the engine 1 has low responsiveness to control instructions, from receiving them to actually changing the torque. In such a case, sensors having high phase velocity, such as the vertical acceleration sensors 15, are used to detect the sprung-mass state so that the control instructions may be outputted to the engine 1 and the brakes 20 faster. On the other hand, if the feedback control systems of the S/As 3 and the brakes 20 having higher responsiveness than the engine 1 use the vertical acceleration sensors 15, the control balance between the engine 1 and these other actuators might be disrupted. For this reason, the sprung-mass state is detected using the stroke sensors 14 having lower phase velocity than the vertical acceleration sensors 15.

In sum, the vertical acceleration sensors 15 of high phase velocity are used for the feedback control system of the engine 1 having lower responsiveness than the brakes 20 and the S/As 3, while the stroke sensors 14 of low phase velocity are used for the feedback systems of the brakes 20 and the S/As 3 having higher responsiveness than the engine 1. The balance in responsiveness among the feedback control systems is thus attained. Note that the vehicle controlling apparatus of Embodiment 1 has a phase compensator 500 configured to compensate for the phase of each of sensor values obtained by the vertical acceleration sensors 15 and the stroke sensors 14. With the above responsiveness balance and further the phase compensation in the feedback control systems, the overall system is stabilized. The following describes each of the feedback control systems sequentially.

(Traveling-State Estimators)

Figure 4:
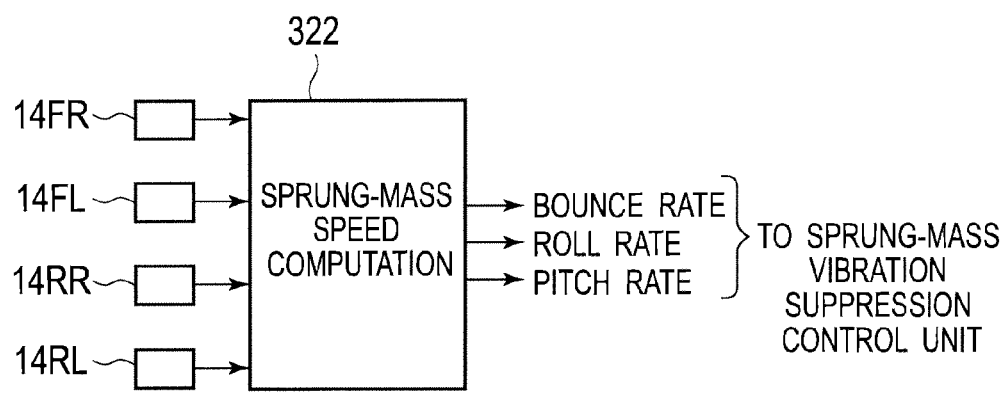
FIG. 4 is a control block diagram illustrating the configuration of a traveling-state estimator of Embodiment 1.

First, the second and third traveling-state estimators are described. FIG. 4 is a control block diagram illustrating the configuration of the third traveling-state estimator 32 of Embodiment 1. Note that the estimation processing by the second traveling-state estimator 200 is substantially the same as that performed by the third traveling-state estimator 32, and therefore only the third traveling-state estimator 32 is described. The third traveling-state estimator 32 of Embodiment 1 includes a sprung-mass speed computer 322. Based on stroke speeds Vz_sFL, Vz_sFR, Vz_sRL, and Vz_sRR detected by the stroke sensors 14FL, 14FR, 14RL, and 14RR for the respective wheels, the sprung-mass speed computer 322 computes a bounce rate, a roll rate, and a pitch rate used by the sprung-mass vibration suppression control unit 33 for its skyhook control (to be described later).

(Estimation Model)

In the skyhook control, the attitude of the sprung mass is controlled using a damping force set based on a relation between the stroke speed of the S/A 3 and the vertical speed of the sprung mass (called a sprung-mass speed below), so as to achieve a level attitude of the running vehicle. To thus control the attitude of the sprung mass through the skyhook control, the speed of the sprung mass needs to be estimated using an estimation model and fed back. A description is given below of problems to be solved and configurations to be adopted by the estimation model.

Figure 5A:
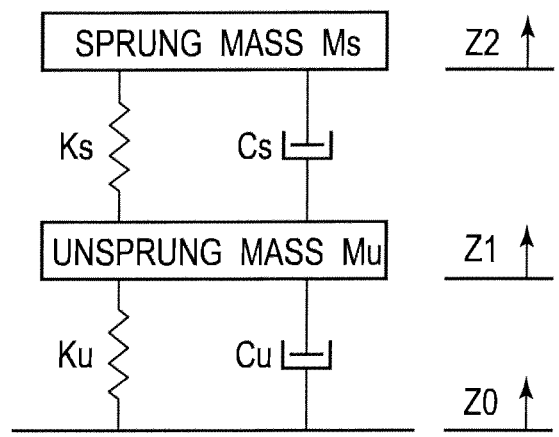
FIG. 5A is a schematic diagram illustrating a vehicle vibration model for a conventional vehicle including S/As configured to generate a constant damping force.
Figure 5B:
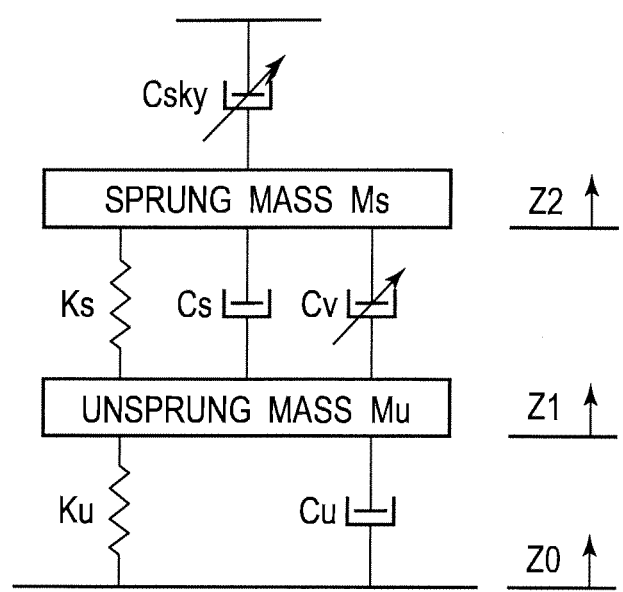
FIG. 5B is a schematic diagram illustrating a vehicle vibration model for a vehicle including S/As configured to generate a variable damping force and for performing skyhook control.

FIGS. 5A and 5B are schematic diagrams each illustrating a vehicle vibration model, FIG. 5A showing a model for a vehicle including S/As of a constant damping force (called a conventional vehicle below), FIG. 5B showing a model for a vehicle performing the skyhook control and including S/As capable of varying their damping force. In FIGS. 5A and 5B, Ms denotes the weight of the sprung mass, Mu the weight of the unsprung mass, Ks an elastic coefficient, Cs a damping coefficient, Ku an elastic coefficient for the unsprung mass (tire), Cu a damping coefficient for the unsprung mass (tire), and Cv a variable damping coefficient. In addition, z2 denotes the position of the sprung mass, z1 the position of the unsprung mass, and z0 the position of the road surface.

When the model for the conventional vehicle shown in FIG. 5A is used, an equation of motion of the sprung mass is expressed as follows, where the first-order differentials (i.e., speed) of z1 and z2 are denoted by dz1 and dz2, and the second-order differentials (i.e., acceleration) of z1 and z2 are denoted by ddz1 and ddz2, respectively.

$$Ms \cdot ddz2 = -Ks(z2-z1) - Cs(dz2-dz1) \quad \text{Estimation Equation 1}$$

This relational expression is organized using Laplace transform as follows.

$$dz2 = -(1/Ms) \cdot (1/s2) \cdot (Cs \cdot s + Ks)(dz2-dz1) \quad \text{Estimation Equation 2}$$

Since dz2−dz1 is the stroke speeds Vz_sFL, Vz_sFR, Vz_sRL, and Vz_sRR, the sprung-mass speed can be calculated from the stroke speeds. However, changing the damping force using the skyhook control drastically decrease estimation accuracy, and therefore the model for the conventional vehicle has a problem of not being able to give a large attitude control force (to change the damping force).

To solve such a problem, it is conceivable to use the vehicle model shown in FIG. 5B which is based on the skyhook control. Basically, to change the damping force means to change the force restricting the speed of the moving piston of the S/A 3 along with suspension strokes. Since the S/A 3 used here is semi-active, meaning that its piston cannot be actively moved in a desired direction (also called passive control), a semi-active skyhook model is adopted. The sprung-mass speed is obtained as follows using the semi-active skyhook model.

$$dz2 = -(1/Ms) \cdot (1/s2) \cdot \{(Cs+Cv) \cdot s + Ks\}(dz2-dz1), \quad \text{Estimation Equation 3}$$

where $Cv = Csky \cdot \{dz2/(dz2-dz1)\}$ when $dz2 \cdot (dz2-dz1) \geq 0$, and $Cv = 0$ when $dz2 \cdot (dz2-dz1) < 0$. In other words, Cv is a discontinuous value.

Here, assume that the sprung-mass speed is estimated using a simple filter. In the semi-active skyhook model, when this model is considered as a filter, the variables correspond to filter coefficients, and the pseudo-differential term $\{(Cs+Cv) \cdot s + Ks\}$ includes the discontinuous variable damping coefficient Cv. Thus, the filter responsiveness becomes unstable, which makes impossible to obtain enough estimation accuracy. The unstable filter responsiveness causes, in particular, phase offset. If the relation between the phase and the sign of the sprung-mass speed is disrupted, the skyhook control cannot be accomplished. For this reason, here, even when the semi-active S/As 3 are used, the sprung-mass speed is estimated using an active skyhook model which can use a stable Csky value without depending on the signs of the sprung-mass speed and the stroke speed. The sprung-mass speed is obtained as follows using the active skyhook model.

$$dz2 = -(1/s) \cdot \{1/(s+Csky/Ms)\} \cdot \{(Cs/Ms)s + (Ks/Ms)\}(dz2-dz1) \quad \text{Estimation Equation 4}$$

In this case, the pseudo-differential term $\{(Cs/Ms)s + (Ks/Ms)\}$ does not have discontinuity, and the term $\{1/(s+Csky/Ms)\}$ can be configured with a low-pass filter. As a result, the filter responsiveness becomes stable, and appropriate estimation accuracy can be obtained. Here, although the active skyhook model is adopted, only semi-active control is actually possible, halving the controllable range. Thus, the estimated sprung-mass speed becomes smaller than the actual speed in a frequency band lower than a sprung-mass resonance. However, the most important in the skyhook control is the phase, and as long as the phase-sign relation is maintained, the skyhook control can be accomplished. Further, the sprung-mass speed is adjustable by other coefficients and the like. Hence, this is not problematic.

It is understandable from the above that the sprung-mass speeds can be estimated from the stroke speeds of the respective wheels. Next, since the vehicle actually has not one but four wheels, the state of the sprung mass is estimated by mode decomposition into a roll rate, a pitch rate, and a bounce rate, using the stroke speeds of the wheels. When those three components are to be calculated from the stroke speeds of four wheels, one corresponding component is missing, which makes the solution is indeterminate. Accordingly, a warp rate indicating a motion of diagonal wheels is added. The following formula holds when the bounce term, roll term, pitch term, and warp term of a stroke amount are denoted by xsB, xsR, xsP, and xsW, and stroke amounts corresponding to the stroke speeds Vz_sFL, Vz_sFR, Vz_sRL, and Vz_sRR are denoted by z_sFL, z_sFR, z_sRL, and z_sRR, respectively.

$$\begin{Bmatrix} z\_sFL \\ z\_sFR \\ z\_sRL \\ z\_sRR \end{Bmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix} \begin{pmatrix} xsB \\ xsR \\ xsP \\ xsW \end{pmatrix} \Rightarrow \begin{pmatrix} xsB \\ xsR \\ xsP \\ xsW \end{pmatrix} = \begin{bmatrix} 1 & 1 & -1 & -1 \\ 1 & -1 & -1 & 1 \\ 1 & 1 & 1 & 1 \\ 1 & -1 & 1 & -1 \end{bmatrix}^{-1} \begin{pmatrix} z\_sFL \\ z\_sFR \\ z\_sRL \\ z\_sRR \end{pmatrix} \quad \text{(Formula 1)}$$

From the above relational expression, differentials dxsB, dxsR, dxsP, and dxsW of xsB, xsR, xsP, and xsW are expressed as follows.

$$dxsB = (\tfrac{1}{4})(Vz\_sFL + Vz\_sFR + Vz\_sRL + Vz\_sRR)$$

$$dxsR = (\tfrac{1}{4})(Vz\_sFL - Vz\_sFR + Vz\_sRL - Vz\_sRR)$$

$$dxsP = (\tfrac{1}{4})(-Vz\_sFL - Vz\_sFR + Vz\_sRL + Vz\_sRR)$$

$$dxsW = (\tfrac{1}{4})(-Vz\_sFL + Vz\_sFR + Vz\_sRL - Vz\_sRR)$$

The relation between the sprung-mass speed and the stroke speed has been obtained using Estimation Equation 4 above. Thus, the bounce rate (dB), the roll rate (dR), and the pitch rate (dP) can be expressed as follows when G is $-(1/s) \cdot \{1/(s+Csky/Ms)\} \cdot \{(Cs/Ms)s + (Ks/Ms)\}$ in Estimation Equation 4, and GB, GR, and GP are values for the bounce term, the roll term, and the pitch term of Csky, Cs, and Ks, the values taking modal parameters (CskyB, CskyR, CskyP, CsB, CsR, CsP, KsB, KsR, and KsP) into consideration.

$$dB = GB \cdot dxsB$$

$$dR = GB \cdot dxsR$$

$$dP = GB \cdot dxsP$$

From the above, the state of the sprung mass of the vehicle can be estimated based on the stroke speeds of the respective wheels. Thus, the brakes 20 and the S/As 3 estimate the sprung-mass speeds based on the stroke speeds, and estimate the behavior of the sprung mass using the estimated sprung-mass speeds.

As for the engine 1, since the vehicle controlling apparatus includes the vertical acceleration sensors 15, the engine 1 can obtain the sprung-mass speed for each wheel by integrating the detected vertical accelerations. For example, it is possible to estimate the pitch rate from the difference between the mean of sprung-mass speeds of the respective front wheels and the mean of sprung-mass speeds of the respective rear wheels, the roll rate from the difference between the mean of sprung-mass speeds of the respective right wheels and the mean of sprung-mass speeds of the respective left wheels, and the bounce rate from the mean of sprung-mass speeds of all the wheels. The engine 1 estimates the sprung-mass speeds based on the values obtained by the vertical acceleration sensors 15. Note that the engine 1 may be configured to estimate the sprung-mass state based on the vertical acceleration sensors 15 by using the estimation equations used for the S/A 3.

(Sprung-Mass Vibration Suppression Control Unit)

Next, a description is given of the skyhook control executed by the sprung-mass vibration suppression control unit 101a, the skyhook control unit 201, and the sprung-mass vibration suppression control unit 33. In the skyhook control, control is performed so that the sprung-mass state estimated based on the stroke speeds as described above can attain a target sprung-mass state. In other words, the stroke speed changes in accordance with the sprung-mass state, and in order to control the state of the sprung mass, such as the bounce, roll, and pitch, to a target state of the sprung mass, the stroke speed detected is changed to an appropriate stroke speed for attaining the target state of the sprung mass.

[Configuration of the Skyhook Control Unit]

In the vehicle controlling apparatus of Embodiment 1, the sprung-mass vibration suppression control unit 101a of the engine controller 1a controls the bounce rate and the pitch rate, the skyhook control unit 201 of the brake controller 2a controls the pitch rate, and the skyhook control unit 33a of the S/A controller 3a controls the bounce rate, the roll rate, and the pitch rate.

The amount of skyhook control in a bounce direction (called a bounce skyhook control amount FB below)

$$FB = C_{skyB} \cdot dB.$$

The amount of skyhook control in a roll direction (called a roll skyhook control amount FR below) is:

$$FR = C_{skyR} \cdot dR.$$

The amount of skyhook control in a pitch direction (called a pitch skyhook control amount FP below) is:

$$FP = C_{skyP} \cdot dP.$$

(Bounce Skyhook Control Amount FB)

The bounce skyhook control amount FB is computed by the sprung-mass vibration suppression control unit 101a as part of an engine attitude control amount, and also by the skyhook control unit 33a as part of an S/A attitude control amount.

(Roll Skyhook Control Amount FR)

The roll skyhook control amount FR is computed by the skyhook control unit 33a as part of the S/A attitude control amount.

(Pitch Skyhook Control Amount FP)

The pitch skyhook control amount FP is computed by the sprung-mass vibration suppression control unit 101a as part of the engine attitude control amount, by the skyhook control unit 201 as a brake attitude control amount, and by the skyhook control unit 33a as part of the S/A attitude control amount.

In order not to give the driver discomfort, the engine attitude controller 101 has a limit value for limiting the engine torque control amount corresponding to the engine attitude control amount. The engine torque control amount is limited so that a longitudinal acceleration converted from the engine torque control amount may fall within a predetermined range. Specifically, when the engine attitude control amount (engine torque control amount) computed based on FB and FP is at or above the limit value, an engine attitude control amount outputted is a skyhook control amount for the bounce rate and the pitch rate obtainable with the limit value. The engine controller 102 computes an engine torque control amount based on the engine attitude control amount obtained according to the limit value, and outputs the engine torque control amount to the engine 1.

In order not to give the driver discomfort, the skyhook control unit 201, like the engine 1, has a limit value for limiting a braking-torque control amount (the limit value will be described in detail later). The braking-torque control amount is limited so that a longitudinal acceleration converted from the braking-torque control amount may fall within a predetermined range (determined by considering factors such as discomfort experienced by the occupant and the life of the actuator). Specifically, when the brake attitude control amount computed based on the pitch skyhook control amount FP is at or above the limit value, the skyhook control unit 201 outputs a pitch-rate suppression amount (called a brake attitude control amount below) obtainable with the limit value to the brake controller 202. The brake control unit 202 computes a brake-torque control amount (or a deceleration) based on the brake attitude control amount obtained according to the limit value, and outputs the brake-torque control amount to the brake 20.

[Brake Pitch Control]

Figure 6:
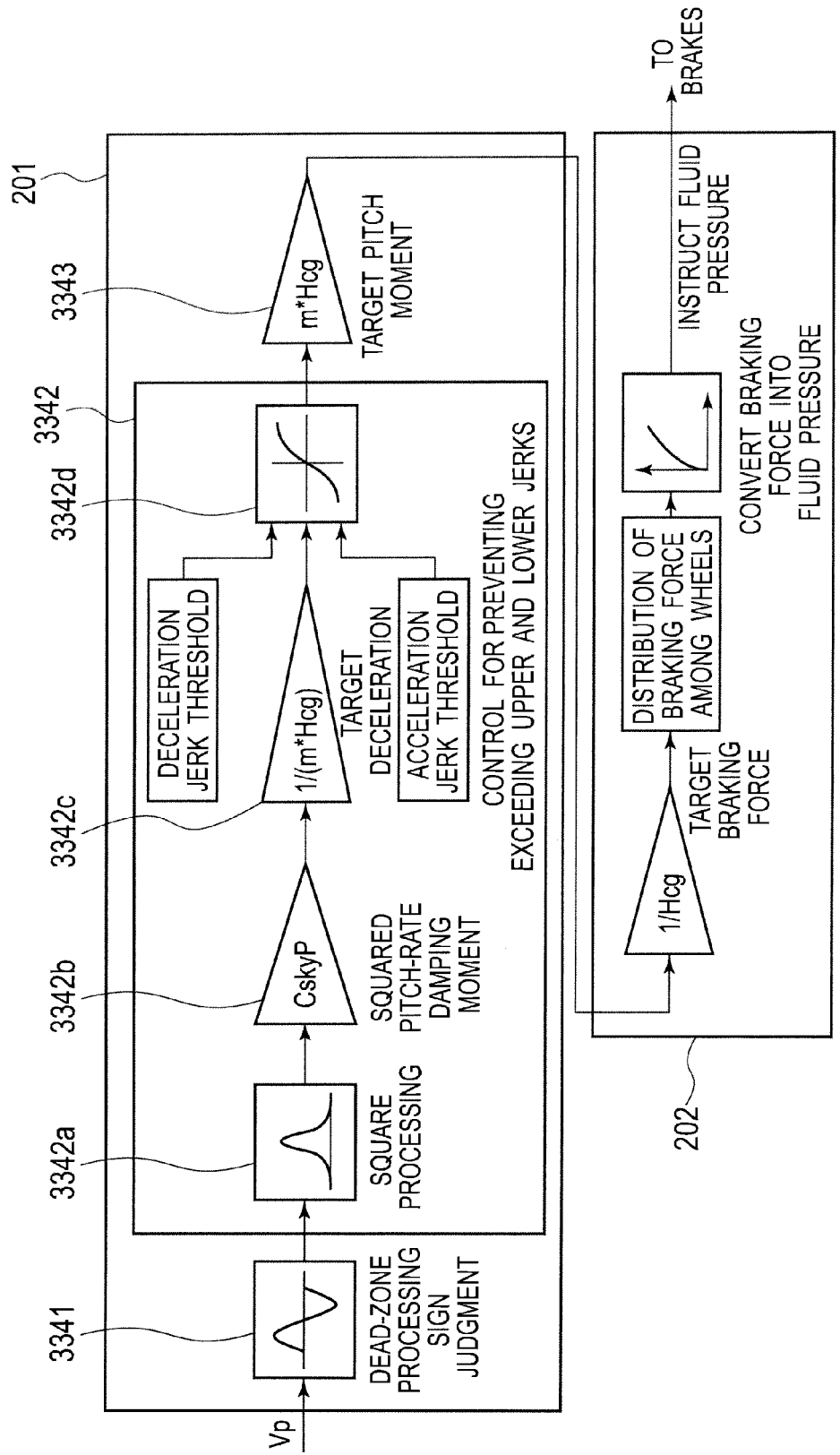
FIG. 6 is a control block diagram illustrating brake pitch control of Embodiment 1.

Pitch control by the brake controller 2a (called brake pitch control below) is described below. Generally, since both the bounce and pitch are controllable by the brakes 20, it might be preferable that both of them be controlled. Nonetheless, the present invention adopts a configuration in which the brakes 20 focus on the pitch control, because the bounce control has the following tendency. Specifically, the bounce control for the brakes 20 causes all the brakes 20 for the four wheels to generate a braking force at the same time. For this reason, despite that the control in the bounce direction is a low-priority control and that control effect is hard to attain, a deceleration feel experienced by the driver is strong, which is likely to cause driver discomfort. FIG. 6 is a control block diagram illustrating the brake pitch control of Embodiment 1. The following relational expressions hold when m denotes the mass of the vehicle body, BFf denotes a braking force to the front wheels, BFr denotes a braking force to the rear wheels, Hcg denotes the height of the center of gravity of the vehicle from the road surface, a denotes the acceleration of the vehicle, Mp denotes a pitch moment, and Vp denotes a pitch rate.

$$BFf + BFr = m \cdot a$$

$$m \cdot a \cdot Hcg = Mp$$

$$Mp = (BFf + BFr) \cdot Hcg$$

When the pitch rate Vp is positive, i.e., the front-wheel side is sinking, no braking force is given. This is because, in this case, a braking force would cause the front-wheel side to sink further, promoting the pitch motion. On the other hand, when the pitch rate Vp is negative, i.e., the front-wheel side is lifted, a braking force is given by a braking pitch moment to suppress the lifting of the front-wheel side. Thereby, the field of view of the driver is secured to make it easier to see ahead, which contributes to improvement in a sense of security and a sense of being level. Hence, the control amount given is:

$$Mp = 0 \text{ when } Vp > 0 \text{ (front wheels sinking)}$$

$$Mp = C_{skyP} \cdot Vp \text{ when } Vp \leq 0 \text{ (front wheels lifted).}$$

In this way, a braking torque is generated only when the front side of the vehicle is lifted. Thus, compared to a case of generating a braking torque also when the front side of the vehicle is sinking, a generated deceleration can be decreased. Moreover, since the frequency of actuating the actuator can be reduced in half, a low-cost actuator can be used.

Based on the above relations, the skyhook control unit 201 is configured with the following control blocks. A dead-zone processing sign determiner 3341 is configured to determine the sign of the inputted pitch rate Vp. Then, when the pitch rate Vp is positive, the dead-zone processing sign determiner 3341 outputs 0 (zero) to a deceleration-feel mitigation processing unit 3342 because no pitch control is necessary. When the pitch rate Vp is negative, the dead-zone processing sign determiner 3341 judges that the pitch control can be performed and outputs a pitch rate signal to the deceleration-feel mitigation processing unit 3342.

[Deceleration Feel Mitigation Processing]

Next, deceleration feel mitigation processing is described. This processing is performed by the brake attitude control amount computer 334 and corresponds to the above-described processing of limiting the braking-torque control amount using the limit value. A square-processing unit 3342a squares the pitch rate signal to thereby invert its sign and to smooth the rise of the control force. A squared pitch-rate damping moment computer 3342b computes a pitch moment Mp by multiplying the squared pitch rate by a skyhook gain CskyP in the pitch term, in which the square processing is taken into account. A target deceleration calculator 3342c computes a target deceleration by dividing the pitch moment Mp by the mass m and the height Hcg of the center of gravity of the vehicle from the road surface.

A jerk threshold limitation unit 3342d determines whether or not the rate of change of the calculated target deceleration, namely jerk, does not exceed a preset deceleration jerk threshold and a preset acceleration jerk threshold and whether or not the target deceleration does not exceed a limit value for the longitudinal acceleration. If the rate of change exceeds any of the jerk thresholds, the target deceleration is corrected to a value not to exceed the jerk thresholds. If the target deceleration exceeds the limit value, it is set not to exceed the limit value. Thereby, generation of a deceleration which causes driver discomfort can be avoided.

A target pitch moment converter 3343 calculates a target pitch moment by multiplying the target deceleration limited by the jerk threshold limitation unit 3342d by the mass m and the height Hcg, and outputs the target pitch moment to the brake controller 202.

[Frequency-Sensitivity Controller]

Next, frequency-sensitivity control processing performed by the sprung-mass vibration suppression control unit is described. In Embodiment 1, the sprung-mass vibration suppression control is accomplished by performing the skyhook control based on sprung-mass speeds estimated basically from detection values obtained by the stroke sensors 14. However, there are such cases that enough estimation accuracy cannot be obtained using the stroke sensors 14, or that depending on a traveling state or the intension of the driver, comfortable running state (giving priority to a smooth ride rather than a flat state of the vehicle body) may be wanted. In such cases, if vector control, such as the skyhook control, is employed, a slight phase offset makes it hard for the control to be performed properly because the relation between the signs of the stroke speed and the sprung-mass speed (such as a phase) is important in the vector control. For this reason, frequency-sensitive control is adopted, which is sprung-mass vibration suppression control performed according to scalar quantity of vibration characteristics.

Figure 7:
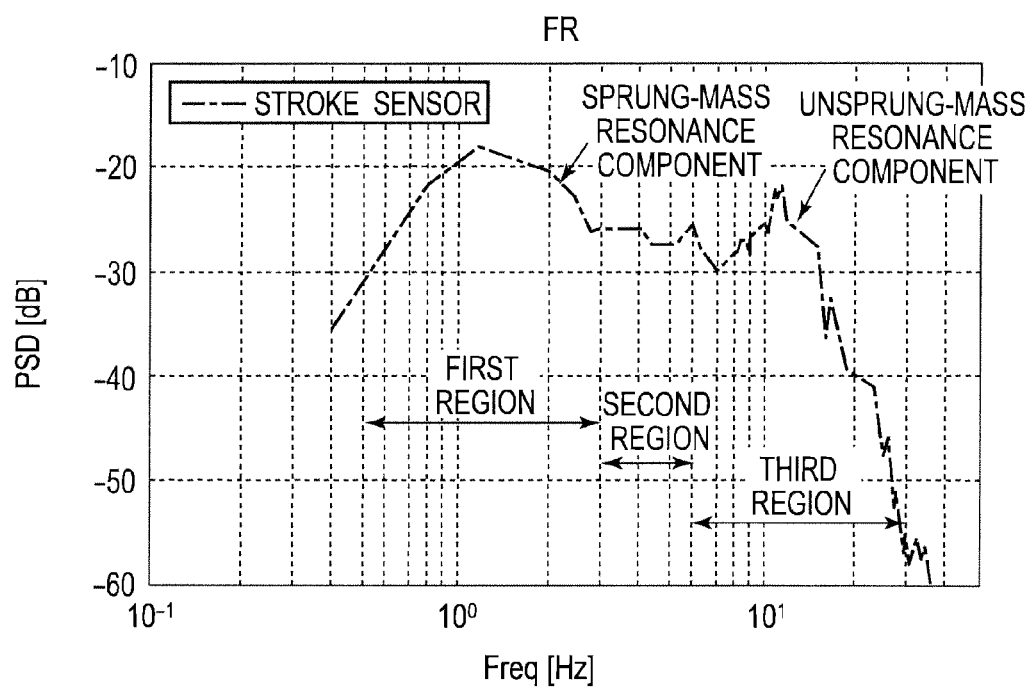
FIG. 7 is a chart illustrating frequency characteristics of a stroke sensor.

FIG. 7 is a graph showing stroke frequency characteristics of the stroke sensors. In the frequency characteristics, the vertical axis represents amplitude with respect to frequency, as a scalar quantity. In a frequency component of the stroke sensor 14, a first region (0.5 Hz to 3 Hz), a second region (3 Hz to 6 Hz), and a third region (6 Hz to 23 Hz) are defined. The "first region" is a frequency region where a sprung-mass resonance frequency component exists, and where the occupant experience such a feel that their bodies are shaken hard to be thrown into the air, or in other words, such a feel that a gravitational acceleration acting on them is decreased. The "second region" is a frequency region between the sprung-mass resonance frequency component and an unsprung-mass resonance frequency component, and which gives not the feel of decrease in gravitational acceleration, but such a feel as if they jump up and down on a trotting horse, or in other words, such a feel that the entire body moves up and down in a followable manner. The "third region" is a frequency region where the unsprung-mass resonance frequency component exists, and where, although the followable vertical motion of the mass of the human body does not occur, small vibration is transmitted to part of the body of the occupant, such as the thighs.

Figure 8:
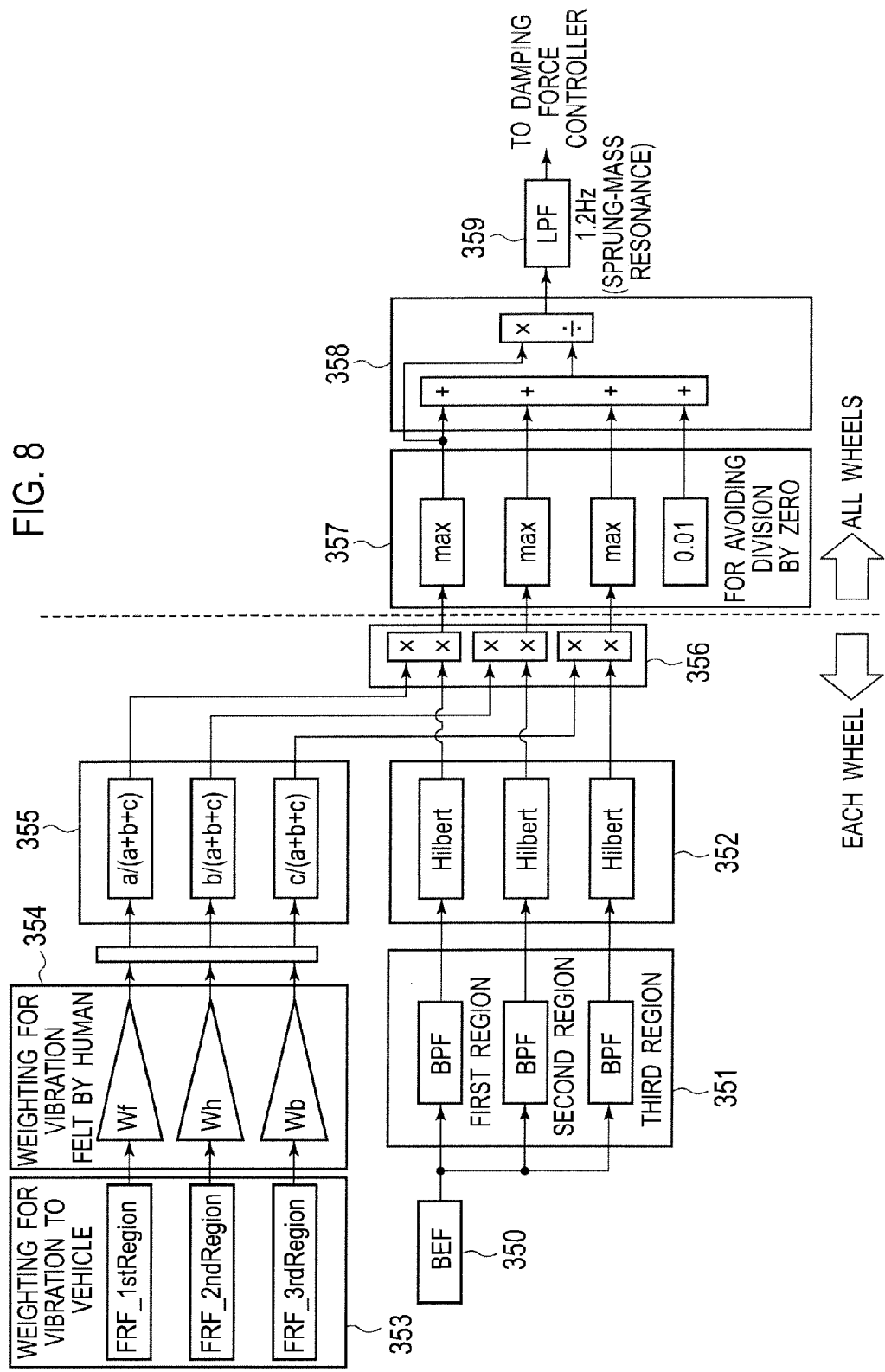
FIG. 8 is a control block diagram illustrating frequency-sensitive control in sprung-mass vibration suppression control of Embodiment 1.

FIG. 8 is a control block diagram illustrating the frequency-sensitive control in the sprung-mass vibration suppression control of Embodiment 1. A band elimination filter 350 eliminates noise of each stroke sensor value so that only the vibration component used in this control remains. A predetermined frequency region division unit 351 divides the vibration component into frequency bands of the first to third regions described above. A Hilbert transform processing unit 352 performs Hilbert transform on each of the divided frequency bands to transform them into scalar quantities which are based on the amplitudes of the frequencies (the scalar quantities being, specifically, areas calculated from the amplitudes and the frequency bands).

A vehicle-vibration weighting unit 353 sets the weight of each of frequency bands corresponding to the first to third regions, for its actual transmission of vibrations to the vehicle. A human-sense weighting unit 354 sets the weight of each of frequency bands corresponding to the first to third regions, for its transmission of vibrations to the occupant.

Figure 9:
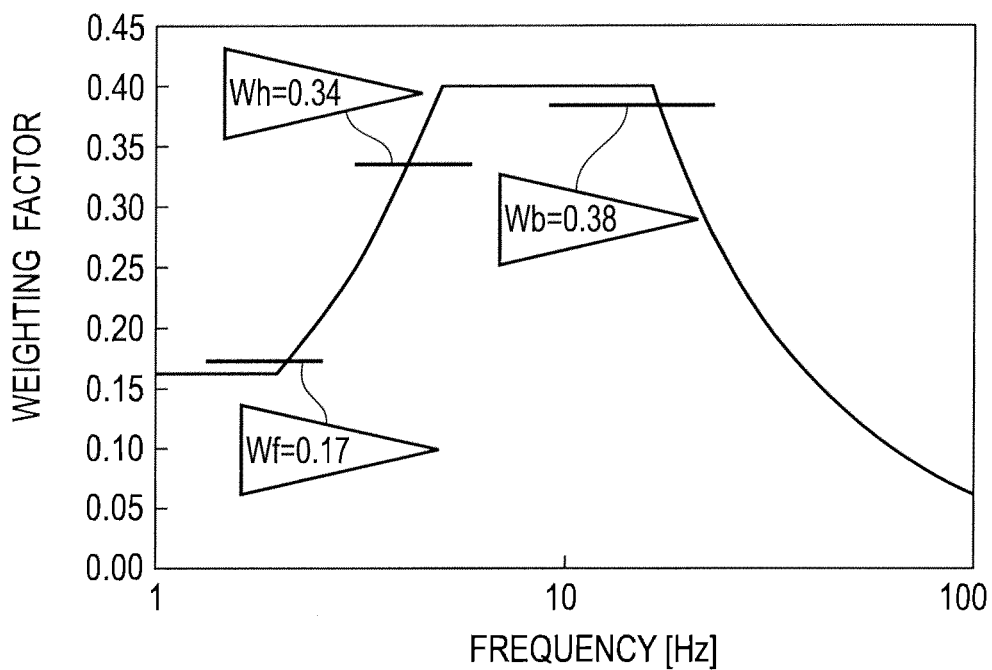
FIG. 9 is a correlation chart illustrating characteristics of human sense in each of frequency regions.

A description is now given of human-sense weighting. FIG. 9 is a correlation chart illustrating characteristics of human sense with respect to frequency. As shown in FIG. 9, a sensitivity of the occupant with respect to frequency is relatively low in the first region (low-frequency region), and gradually increases toward the high-frequency region. Vibrations are not transmitted to the occupant in the high-frequency region beyond the third region. Considering the above, a human-sense weight in the first region Wf is set to 0.17, a human-sense weight in the second region Wh is set to 0.34 which is larger than Wf, and a human-sense weight in the third region Wb is set to 0.38 which is larger than Wf and Wh. Thereby, a correlation between the scalar quantity of each of the frequency bands and vibrations actually transmitted to the occupant can be further improved. Note that these two weight coefficients may be changed appropriately according to the concept of the vehicle or the preference of the driver.

A weight determiner 355 calculates a ratio of each of the weights of the respective frequency bands to all the weights. When a denotes the weight for the first region, b the weight for the second region, and c the weight for the third region, a weight coefficient for the first region is (a/(a+b+c)), that for the second region is (b/(a+b+c)), and that for the third region is (c/(a+b+c)).

A scalar-quantity computer 356 obtains final scalar quantities by respectively multiplying the scalar quantities of the frequency bands calculated by the Hilbert transform processing unit 352 by the weights calculated by the weight determiner 355, and outputs the final scalar quantities. The processing thus far is performed on each of the stroke sensor values of the respective wheels.

A maximum-value selector 357 selects the maximum value of the final scalar quantities computed for the respective four wheels. Note that 0.1 at the bottom is set so that, when the total of the maximum values is assigned to a denominator in later processing, the denominator may not be zero. A ratio computer 358 computes a ratio, by assigning the total of the maximum scalar quantity values of the respective frequency bands to the denominator and assigning the maximum scalar quantity value of the frequency band corresponding to the first region to the numerator. In other words, the ratio computer 358 computes the ratio of the first region contained in the total of the vibration components. A sprung-mass resonance filter 359 performs filtering processing of about a sprung-mass resonance frequency of 1.2 Hz on the calculated ratio to extract the sprung-mass resonance frequency component corresponding to the first region based on the calculated ratio. This is because, since the first region exists around 1.2 Hz, it can be thought that the ratio of the first region changes around 1.2 Hz, too. Then, the final extracted ratio is outputted to a damping-force controller 35, which outputs a frequency-sensitive damping force control amount according to that ratio.

Figure 10:
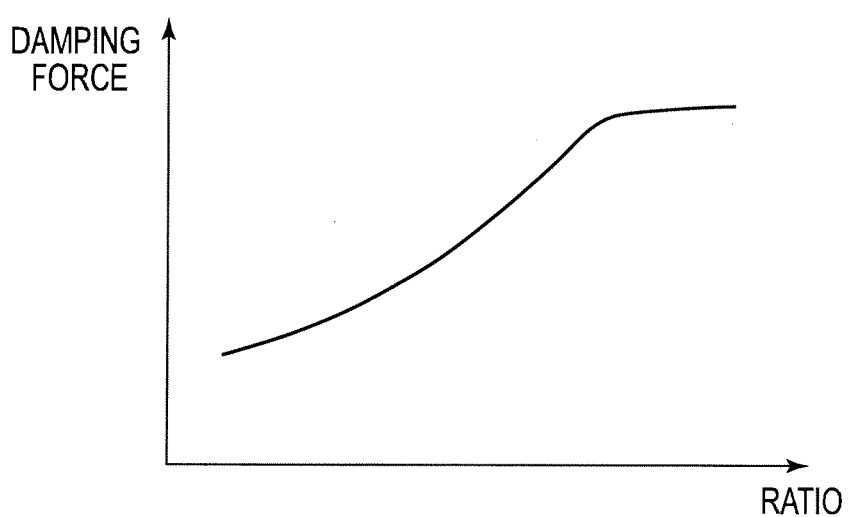
FIG. 10 is a characteristics chart showing the relation between the inclusion ratio of first-region vibrations and a damping force obtained by the frequency-sensitive control of Embodiment 1.

FIG. 10 is a characteristics chart showing the relation between the inclusion ratio of first-region vibrations and a damping force obtained by the frequency-sensitive control of Embodiment 1. As shown in FIG. 10, a vibration level of the sprung-mass resonance is decreased by setting the damping force high where the ratio of the first region is large. Even when the damping force is set high, high-frequency vibrations and vibrations followable by the entire body are not transmitted to the occupant since the second and third regions have small ratios. On the other hand, the damping force is set low when the ratio of the first region is small. Thus, vibration transmission characteristics equal to or above the sprung-mass resonance decrease to suppress the high-frequency vibrations, which contributes to a smooth, comfortable ride.

Figure 11:
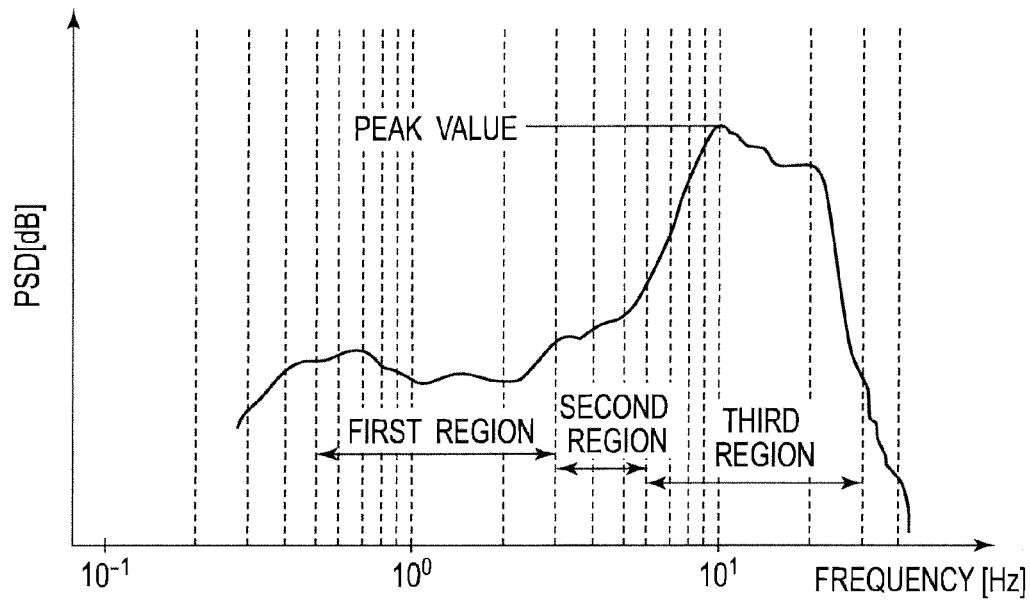
FIG. 11 is a chart illustrating the frequency characteristic of a stroke speed detected by the stroke sensor 14 under certain traveling states.

Next, a description is given of advantages of the frequency-sensitive control over the skyhook control. FIG. 11 shows a chart illustrating the frequency characteristic of a stroke speed detected by the stroke sensor 14 under certain traveling states. FIG. 11 shows a characteristic which would be obtained if the vehicle ran on, for example, a stone-paved road having successive small recesses and bumps. When the skyhook control is performed on a vehicle running on a road surface having such a characteristic, the skyhook control determines the damping force based on the value of peak amplitude. Consequently, if phase estimation is made poorly with respect to input of high-frequency vibrations, a very high damping force is given at a wrong timing to lower the high-frequency vibration characteristics.

In contrast, the frequency-sensitive control, which uses not vectors but scalar quantities, sets a small damping force for such a road surface as shown in FIG. 11 since the ratio of the first region is small. Thereby, even when the amplitude of vibrations in the third region is large, the vibration transmission characteristic decreases sufficiently to avoid lowering the high-frequency vibration characteristics. For this reason, high-frequency vibrations can be suppressed by the frequency-sensitive control, which uses scalar quantities, in a region which is hard to control by the skyhook control using expensive sensors and the like if the phase estimation accuracy is poor.

(S/A-Side Driver-Input Controller)

Next, the S/A-side driver-input control unit is described. The S/A-side driver-input control unit 31 computes a driver-input damping force control amount for attaining a vehicle behavior that the driver wants accomplished, based on signals from the steer-angle sensor 7 and the vehicle-speed sensor 8, and outputs the driver-input damping force control amount to the damping-force controller 35. For example, when the driver makes a turn, the nose of the vehicle is lifted, which is likely to deflect the view of the driver from the road surface. In this case, to prevent such nose lifting, the S/A-side driver-input control unit 31 outputs damping forces for the four wheels as driver-input damping force control amounts. Further, the S/A-side driver-input control unit 31 also outputs driver-input damping force control amounts for suppressing the roll motion caused when the turn is made.

(Roll Control by the S/A-Side Driver-Input Controller)

Figure 12:
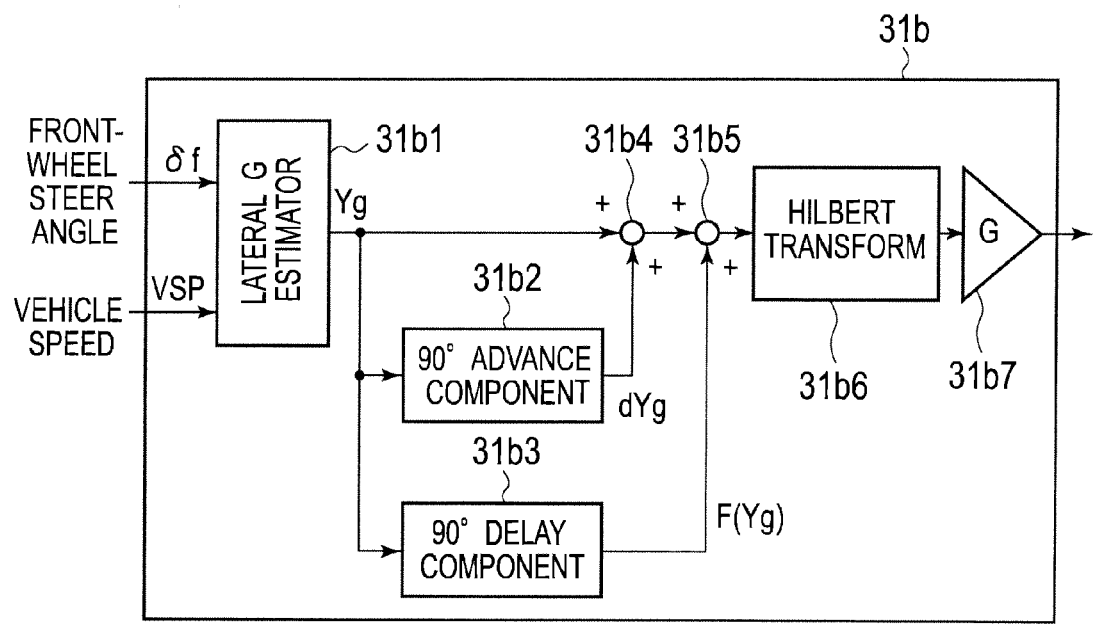
FIG. 12 is a control block diagram illustrating the configuration of roll-rate suppression control of Embodiment 1.

A description is given now of roll-rate suppression control performed by the S/A-side driver-input controller. FIG. 12 is a control block diagram illustrating the configuration of roll-rate suppression control of Embodiment 1. A lateral acceleration estimator 31$b$1 estimates a lateral acceleration Yg based on a front-wheel steer angle δf detected by the steer-angle sensor 7 and on a vehicle speed VSP detected by the vehicle-speed sensor 8. The lateral acceleration Yg is calculated by the equation below based on a vehicle plan view model, when A is a predetermined value.

$$Yg = (VSP2/(1+A \cdot VSP2)) \cdot \delta f$$

A 90° phase advance component creator 31$b$2 differentiates the estimated lateral acceleration Yg, and outputs a differentiated lateral acceleration dYg. A first adder 31$b$4 adds the lateral acceleration Yg and the differentiated lateral acceleration dYg together. A 90° phase delay component creator 31$b$3 outputs a component F (Yg) obtained by delaying the phase of the estimated lateral acceleration Yg by 90°. A second adder 31$b$5 adds the value obtained by the first adder 31$b$4 to the component F (Yg). A Hilbert transform unit 31$b$6 computes a scalar quantity based on an envelope waveform of the added value. A gain multiplier 31$b$7 multiplies the scalar quantity which is based on the envelope waveform by the gain to compute a driver-input attitude control amount used for the roll-rate suppression control, and outputs the control amount to the damping-force controller 35.

Figure 13:
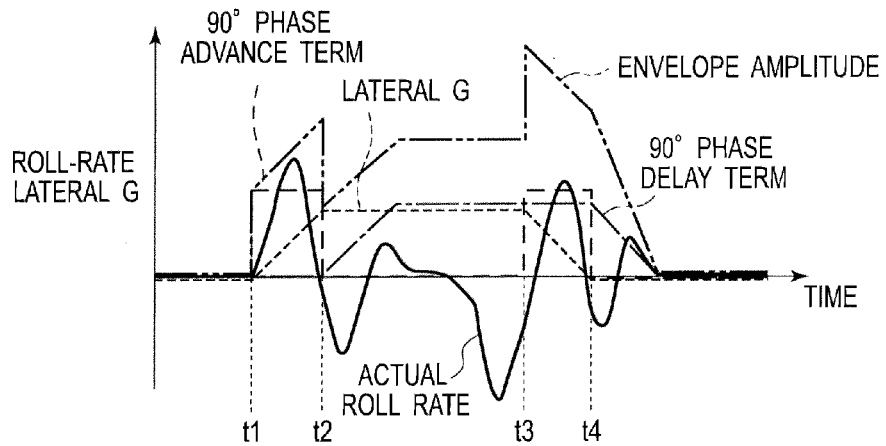
FIG. 13 is a time chart illustrating envelop-waveform formation processing in the roll-rate suppression control of Embodiment 1.

FIG. 13 is a time chart illustrating envelop-waveform formation processing in the roll-rate suppression control of Embodiment 1. Once the driver starts steering at Time t1, the roll rate starts to be generated gradually. In this event, the generation of the roll rate at the initial stage of the steering can be suppressed by a driver-input attitude control amount computed from a scalar quantity which is based on an envelope waveform formed by addition of a 90° phase advance component. Next, when the driver stops steering at Time t2, the phase delay component F (Yg) is added instead of the 90° phase advance component. In this steady steering state, even when the roll rate does not change much, a roll-rate resonance component is generated, which corresponds to a swing-back of the roll rate. If the phase delay component F(Yg) had not been added, a small damping force would be set for a period between Time t2 and Time t3, which might make the vehicle behavior unsteady due to the roll-rate resonance component. The 90° phase delay component F (Yg) is added in order to suppress this roll-rate resonance component.

When the driver turns the steering wheel from the steering-stop position back to the neutral position to run straight at time t3, the lateral acceleration Yg decreases, and the roll rate is decreased to a small value. The damping force is surely secured by the action of the 90° phase delay component F (Yg), and therefore the unsteady vehicle behavior due to the roll-rate resonance component is avoided.

(Unsprung-Mass Vibration Suppression Control Unit)

Next, the configuration of the unsprung-mass vibration suppression control unit is described. As described earlier as to the conventional vehicle in FIG. 5A, a tire has an elastic coefficient and a damping coefficient, too, and therefore a resonance frequency band exists. However, since the tire has a smaller mass and a larger elastic coefficient than the sprung mass, the unsprung-mass resonance component exists at a higher frequency than the sprung-mass resonance component. This unsprung-mass resonance component shakes the tire at the unsprung-mass side, which might lead to a poor road-hugging performance. Further, the shaky motion at the unsprung-mass side might cause discomfort to the occupant. A damping force according to the unsprung-mass resonance component is set to suppress the shaking of the tire due to the unsprung-mass resonance.

Figure 14:
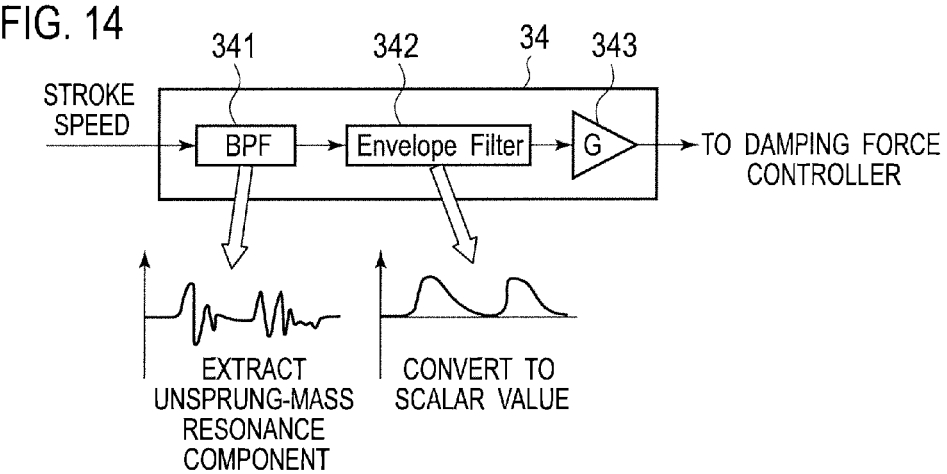
FIG. 14 is a block diagram illustrating the control configuration of unsprung-mass vibration suppression control of Embodiment 1.

FIG. 14 is a block diagram illustrating the control configuration of the unsprung-mass vibration suppression control of Embodiment 1. An unsprung-mass resonance component extractor 341 extracts an unsprung-mass resonance component through bandpass-filtering of a stroke speed. The unsprung-mass resonance component is extracted from a region of about 10 Hz to 20 Hz of the stoke-speed frequency component. An envelope waveform shaper 342 obtains a scalar value of the extracted unsprung-mass resonance component, and shapes an envelope waveform by using an envelope filter. A gain multiplier 343 multiplies the scalar unsprung-mass resonance component by the gain to calculate an unsprung-mass vibration suppression damping force control amount, and outputs it to the damping-force controller 35. In Embodiment 1, the unsprung-mass resonance component is extracted through bandpass-filtering of the stroke speed outputted from a deviation computer 321b of the traveling-state estimator 32. Instead, the traveling-state estimator 32 may estimate the unsprung-mass speed, in addition to the sprung-mass speed, to extract the unsprung-mass resonance component.

(Configuration of the Damping Force Controller)

Figure 15:
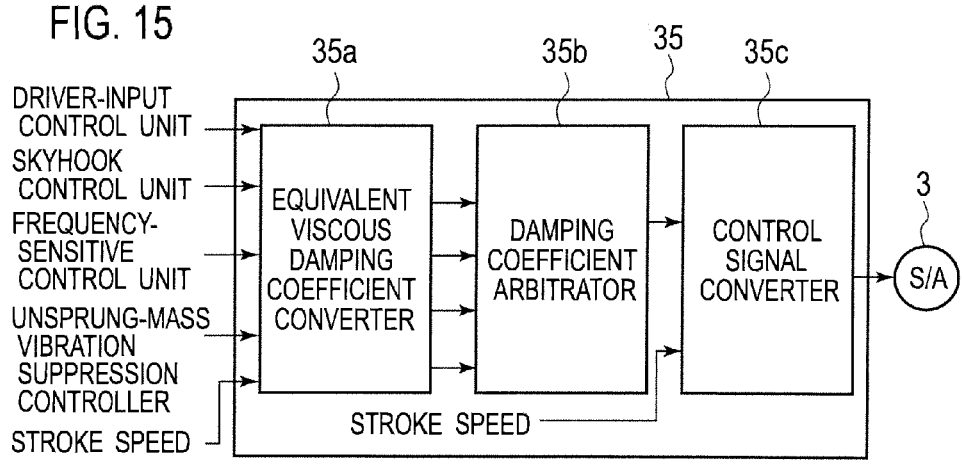
FIG. 15 is a control block diagram illustrating the control configuration of a damping-force controller of Embodiment 1.

Next, the configuration of the damping-force controller 35 is described. FIG. 15 is a control block diagram illustrating the control configuration of the damping-force controller 35 of Embodiment 1. An equivalent viscous damping coefficient transformer 35a receives the driver-input damping force control amount from the driver-input control unit 31, the S/A attitude control amount outputted from the skyhook control unit 33a, the frequency-sensitive damping force control amount outputted from the frequency-sensitive control unit 33b, the unsprung-mass vibration suppression damping force control amount outputted from the unsprung-mass vibration suppression control unit 34, and the stroke speeds computed by the traveling-state estimator 32, and then transforms the control amounts into equivalent viscous damping coefficients (hereinafter referred to as a driver-input damping coefficient k1, an S/A attitude damping coefficient k2, a frequency-sensitive damping coefficient k3, and an unsprung-mass vibration suppression damping coefficient k4, respectively).

A damping coefficient arbitrator 35b arbitrates as to which of the damping coefficients obtained by the equivalent viscous damping coefficient transformer 35a the control should be made based upon, and outputs the final damping coefficient. A control signal transformer 35c obtains a control signal (instruction current value) to be outputted to the S/A 3 based on the damping coefficient obtained by the damping coefficient arbitrator 35b and on the stroke speeds, and outputs the signal to the S/A 3.

[Damping Coefficient Arbitrator]

Next, a description is given of arbitration processing performed by the damping coefficient arbitrator 35b. The vehicle controlling apparatus of Embodiment 1 has four control modes: Standard mode, Sports mode, Comfort mode, and Highway mode. Standard mode assumes that the vehicle drives in an urban area and makes turns moderately; Sports mode assumes that the vehicle drives actively on a winding road and the like and makes turns stably; Comfort mode assumes that ride quality is prioritized such as at the time of low-speed starting of the vehicle; Highway mode assumes that the vehicle runs at high speed on highways and the like mostly straight.

In Standard mode, while the unsprung-mass vibration suppression control performed by the unsprung-mass vibration suppression control unit 34 is prioritized, the skyhook control by the skyhook control unit 33a is also selected.

In Sports mode, while the driver-input control by the driver-input control unit 31 is prioritized, the skyhook control by the skyhook control unit 33a and the unsprung-mass vibration suppression control by the unsprung-mass vibration suppression control unit 34 are also selected.

In Comfort mode, while the unsprung-mass vibration suppression control by the unsprung-mass vibration suppression control unit 34 is prioritized, the frequency-sensitive control by the frequency-sensitive control unit 33b is also selected.

In Highway mode, while the driver-input control by the driver-input control unit 31 is prioritized, control in which a control amount obtained by the unsprung-mass vibration suppression control performed by the unsprung-mass vibration suppression control unit 34 is added to a control amount obtained by the skyhook control performed by the skyhook control unit 33a is also selected.

Arbitration of damping coefficients in each of these modes is described below.

(Arbitration in Standard Mode)

FIG. 16 is a flowchart showing damping coefficient arbitration processing performed in Standard mode in Embodiment 1.

In Step S1, a determination is made whether or not the S/A attitude damping coefficient k2 is larger than the unsprung mass damping coefficient k4. When k2 is larger than k4, the processing proceeds to Step S4 to set k2 as the damping coefficient.

In Step S2, the ratio of the scalar quantity of the third region is computed based on the scalar quantities of the respective first to third regions described earlier regarding the frequency-sensitive control unit 33b.

In Step S3, a determination is made whether or not the ratio of the third region is at or above a predetermined value. When the ratio is at or above the predetermined value, the processing proceeds to Step S4 to set k2, which is the lower value, as the damping coefficient, because there is a concern that a large damping coefficient might lower the ride quality due to high-frequency vibrations. When, on the other hand, the ratio is below the predetermined value, the processing proceeds to Step S5 to set k4 as the damping coefficient, because there is little concern that a large damping coefficient lowers the ride quality due to high-frequency vibrations.

As described above, in Standard mode, the unsprung-mass vibration suppression control which suppresses the unsprung-mass resonance is generally prioritized. However, when a damping force required by the skyhook control is equal to or below that required by the unsprung-mass vibration suppression control, and then when the ratio of the third region is large, the damping force required by the skyhook control is used so as to prevent lowering of the high-frequency vibration characteristics, which is caused by using the damping force required by the unsprung-mass vibration suppression control. Thereby, an optimum damping characteristic can be obtained according to the traveling states, the lowering of the ride quality due to high-frequency vibrations can be avoided, while allowing the driver to feel that the vehicle body is level.

(Arbitration in Sports Mode)

FIG. 17 is a flowchart showing damping coefficient arbitration processing performed in Sports mode in Embodiment 1.

In Step S11, damping force distribution ratios are computed for the respective four wheels based on the driver-input damping coefficient k1 of each of the four wheels set by the driver-input control. The damping force distribution ratios xfr, xfl, xrr, and xrl of the respective wheels are calculated as follows when the driver-input damping coefficient for the front right wheel is denoted by k1$fr$, that for the front left wheel is denoted by k1$fl$, that for the rear right wheel is denoted by k1$rr$, and that for the rear left wheel is denoted by k1$rl$.

$xfr=k1fr/(k1fr+k1fl+k1rr+k1rl)$ $xfl=k1fl/(k1fr+k1fl+k1rr+k1rl)$ $xrr=k1rr/(k1fr+k1fl+k1rr+k1rl)$ $xrl=k1rl/(k1fr+k1fl+k1rr+k1rl)$ In Step S12, a determination is made whether or not the damping force distribution ratios x are within a predetermined range (larger than α and smaller than β). When all the ratios x are within the predetermined range, it is judged that the distribution is made almost equally among the wheels, and the processing proceeds to Step S13. When any one of the ratios x is out of the predetermined range, the processing proceeds to Step S16.

In Step S13, a determination is made whether or not the unsprung-mass vibration suppression damping coefficient k4 is larger than the driver-input damping coefficient k1. When k4 is larger than k1, the processing proceeds to Step S15 to set k4 as a first damping coefficient k. When, on the other hand, k4 is equal to or smaller than k1, the processing proceeds to Step S14 to set k1 as the first damping coefficient k.

In Step S16, a determination is made whether or not the unsprung-mass vibration suppression damping coefficient k4 is a maximum value (max) settable by the S/A 3. The processing proceeds to Step S17 when k4 is the maximum value (max), and if not, proceeds to Step S18.

In Step S17, a damping coefficient at which the maximum value of the driver-input damping coefficients k1 of the four wheels is the unsprung damping coefficient k4 and is within the damping-force distribution ratio range is set as the first damping coefficient k. In other words, a damping coefficient which is the largest but is still within the predetermined damping-force distribution ratio range is computed.

In Step S18, a damping coefficient at which all the driver-input damping coefficients k1 of the four wheels are larger than k4 and is within which still satisfies the damping-force distribution ratio range is computed as the first damping coefficient k. In other words, a value which is within the damping-force distribution ratio range set by the driver-input control, and which still satisfies the request by the unsprung-mass vibration suppression control is computed.

In Step S19, a determination is made whether or not the first damping coefficient k set by in the above steps is smaller than the S/A attitude damping coefficient k2 set by the skyhook control. When k is smaller than k2, which means that the damping coefficient required by the skyhook control is larger, the processing proceeds to Step S20 to set k2 as the final damping coefficient. When k is equal to or larger than k2, the processing proceeds to Step S21 to set k as the final damping coefficient.

As described, in Sports mode, the unsprung-mass vibration suppression control which suppresses unsprung-mass resonance is generally prioritized. However, since the damping-force distribution ratio required by the driver-input control is closely associated with the attitude of the vehicle body, and is deeply associated the vision change of the driver in the roll mode in particular. For this reason, the first priority is not the damping coefficient per se required by the driver-input control, but is securement of the damping-force distribution ratio. To change the attitude of the vehicle body while securing the damping-force distribution ratio, the skyhook control is selected by select-high so that stable attitude of the vehicle body can be maintained.

(Arbitration in Comfort Mode)

Figure 18:
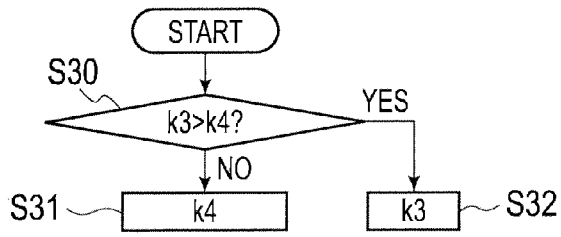
FIG. 18 is a flowchart showing damping coefficient arbitration processing performed in Comfort mode in Embodiment 1.

FIG. 18 is a flowchart showing damping coefficient arbitration processing performed in Comfort mode in Embodiment 1.

In Step S30, a determination is made whether or not the frequency-sensitive damping coefficient k3 is larger than the unsprung-mass vibration suppression damping coefficient k4. When k4 is larger than k3, the processing proceeds to Step S32 to set the frequency-sensitive damping coefficient k3. When, on the other hand, k3 is equal to or smaller than k4, the processing proceeds to Step S32 to set the unsprung-mass vibration suppression damping coefficient k4.

As described, in Comfort mode, the unsprung-mass vibration suppression control which suppresses unsprung-mass resonance is generally prioritized. Since the frequency-sensitive control is performed as the unsprung-mass vibration suppression control to thereby set an optimum damping coefficient in accordance with road conditions, the control can secure a certain ride quality. Further, the unsprung-mass vibration suppression control can avoid shaking of the unsprung mass and thus avoid lowering the road-hugging performance. In Comfort mode, as in Standard mode, the damping coefficient may be switched according to the ratio of the frequency scalar quantity in the third region. Thereby, Super-comfort mode offering an even better ride quality can be provided.

(Arbitration in Highway Mode)

Figure 19:
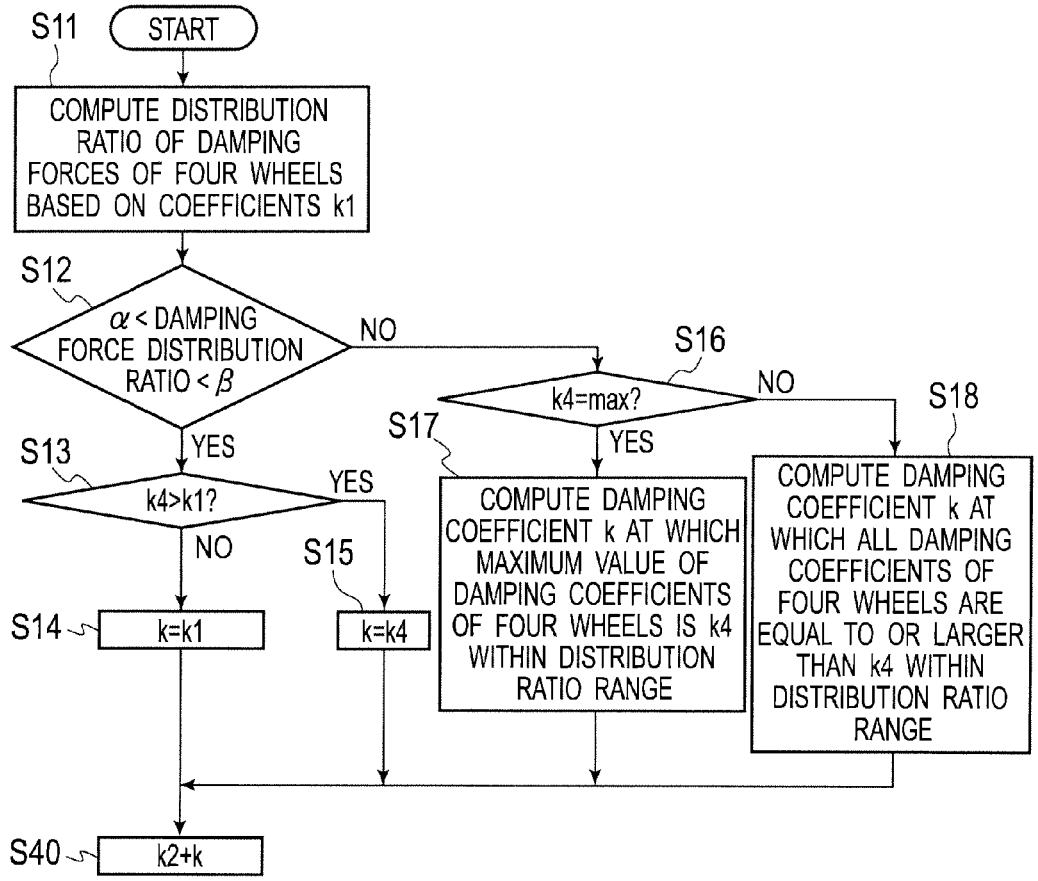
FIG. 19 is a flowchart showing damping coefficient arbitration processing performed in Highway mode in Embodiment 1.

FIG. 19 is a flowchart showing damping coefficient arbitration processing performed in Highway mode in Embodiment 1. Processing from Steps S11 to S18 is the same as that of the arbitration in Sports mode, and therefore is not described again.

In Step S40, the S/A attitude damping coefficient k2 set by the skyhook control is added to the first damping coefficient k obtained by the arbitration processing performed up to Step S18, and a value thus obtained is outputted.

Figure 20:
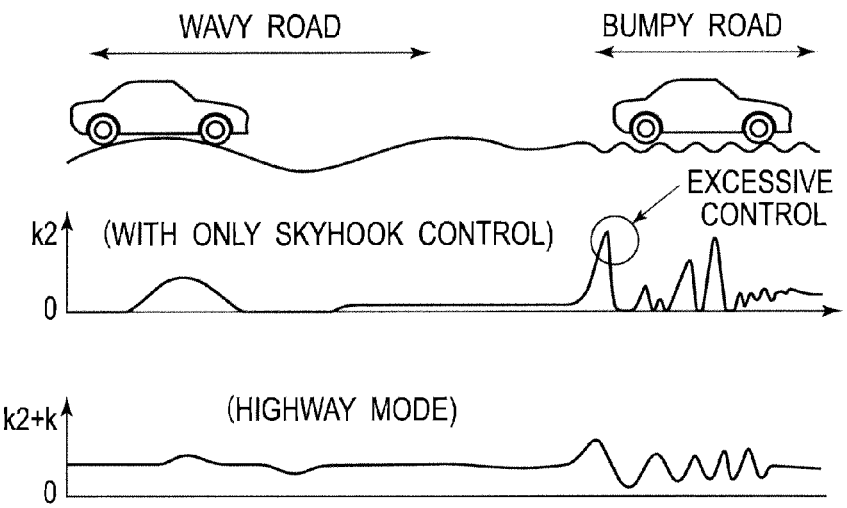
FIG. 20 is a time chart showing a change in the damping coefficient for a vehicle running on a wavy road and a bumpy road.

As described, in Highway mode, arbitration of the damping coefficient is performed using the value obtained by adding the S/A attitude damping coefficient k2 to the arbitrated first damping coefficient k. Advantageous effects are now described with reference to FIG. 20 which is a time chart showing a change in the damping coefficient for a vehicle running on a wavy road and a bumpy road. For example, suppose that a vehicle experiences a relatively low frequency motion of a vehicle body by running on a wavy highway. If only the skyhook control is used to suppress such a motion, there is a need to detect a minute change in the stroke speed, and therefore the gain of the skyhook control needs to be set very high. Then, a motion of relatively low frequency can be suppressed, but if the vehicle runs on a bumpy road in this case, the large control gain might lead to excessive damping-force control. This brings about concerns about lowering the ride quality and/or the attitude of the vehicle body.

In contrast, since the first damping coefficient k is constantly set in Highway mode, a certain level of damping force is always secured. Thus, even when the damping coefficient by the skyhook control is small, the relatively low frequency motion of the vehicle body can be suppressed. In addition, since there is no need for the gain of the skyhook control to be high, appropriate processing can be performed against a bumpy road as well with a normal gain. Moreover, since the skyhook control is performed with the first damping coefficient k being set, unlike the damping coefficient limitation, an operation for a step of decreasing the damping coefficient is possible in a semi-active control region to allow a stable vehicle attitude during high-speed running.

(Mode Selection Processing)

Figure 21:
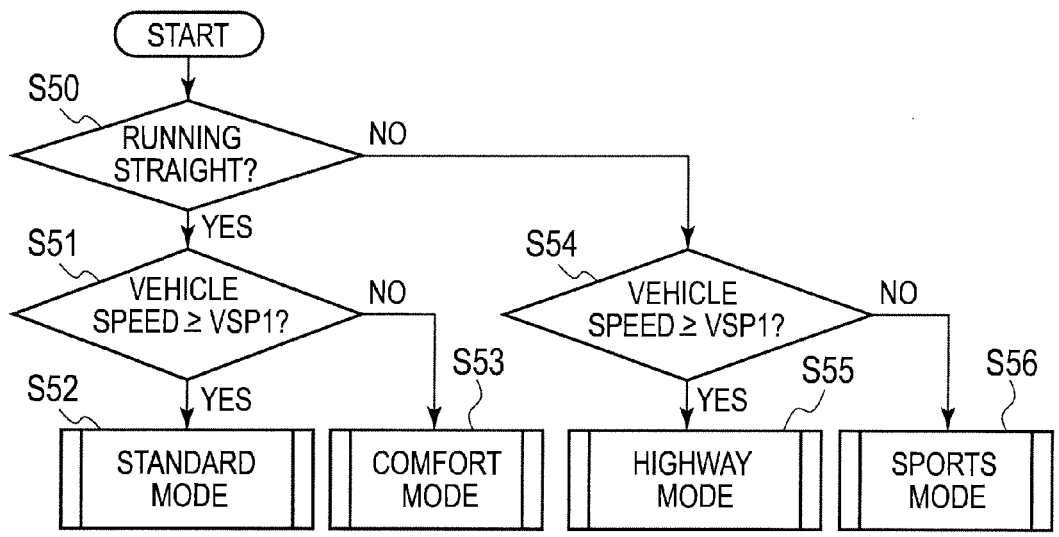
FIG. 21 is a flowchart showing mode selection processing in Embodiment 1 performed by a damping coefficient arbitrator of Embodiment 1 based on traveling states.

Next, a description is given of mode selection processing for selecting from the above running modes. FIG. 21 is a flowchart showing the mode selection processing in Embodiment 1 performed by the damping coefficient arbitrator 35b based on traveling states.

In Step S50, a determination is made based on a value from the steer-angle sensor 7 whether or not the vehicle is running straight. The processing proceeds to Step S51 if the vehicle is running straight, and to Step S54 if the vehicle is turning.

In Step S51, a determination is made based on a value from the vehicle-speed sensor 8 whether or not the value is equal to or larger than a predetermined vehicle speed VSP1 which indicates a high-speed running state. If the sensor value is equal to or larger than VSP1, the processing proceeds to Step S52 to select Standard mode. If the sensor value is smaller than VSP1, the processing proceeds to Step S53 to select Comfort mode.

In Step S54, a determination is made based on a value from the vehicle-speed sensor 8 whether or not the value is equal to or larger than the predetermined vehicle speed VSP1 which indicates a high-speed running state. If the sensor value is equal to or larger than VSP1, the processing proceeds to Step S55 to select Highway mode. If the sensor value is smaller than VSP1, the processing proceeds to Step S56 to select Sports mode.

Thus, Standard mode is selected when the vehicle is running straight at high speed. Thereby, the attitude of the vehicle body is stabilized by the skyhook control, and also, a ride quality is secured by suppressing the vibrations of frequencies in the second region and the third region. In addition, the unsprung-mass resonance can be suppressed. Comfort mode is selected when the vehicle is running at low speed. Thereby, the unsprung-mass resonance can be suppressed while preventing the vibrations of frequencies in the second region and the third region from being inputted to the occupant as much as possible.

On the other hand, Highway mode is selected when the vehicle is turning and running at high speed. Thereby, the vehicle is controlled using a value obtained by addition of the damping coefficients, and therefore generally a high damping force can be attained. Thus, even when the vehicle is running at high speed, the unsprung-mass resonance can be suppressed while the attitude of the vehicle body making a turn is actively secured by the driver-input control. Sports mode is selected when the vehicle is running at low speed. Thereby, the unsprung-mass resonance is suppressed while the driver-input control is performed to actively secure the attitude of the vehicle body making a turn, and while the skyhook control is appropriately performed. Thus, the vehicle can run with a stable attitude.

Although the running modes are automatically switched through detection of the running state of the vehicle in Embodiment 1, the running modes may be switched by a switch operated by the driver. Thereby, a ride quality and turning performance in accordance with the intension of the driver can be obtained.

Embodiment 1 described above offers advantageous effects listed below.

(1) A vehicle controlling apparatus comprises: the vertical acceleration sensor 15 configured to detect a vertical acceleration of a sprung mass; the engine controller 1a (power-source attitude controller) configured to compute a power-source attitude control amount for a driving force outputted from the engine 1 (a power source) (the computation being made by the engine attitude controller 101), the control amount making a sprung-mass state estimated by the first traveling-state estimator 100 based on the acceleration detected by the vertical acceleration sensor 15 a stable sprung-mass state (an appropriate acceleration for attaining a target sprung-mass state), and to control the engine 1 based on the power-source attitude control amount; the stroke sensor 14 configured to detect a stroke speed of the S/A 3 (a damping-force-variable shock absorber); and the brake controller 2a (friction-brake attitude controller) configured to compute a brake attitude control amount for a braking force outputted from the brake 20 (a friction brake), the control amount making a sprung-mass state estimated by the second traveling-state estimator 200 based on the stroke speed detected by the stroke sensor 14 a stable sprung-mass state (an appropriate stroke speed for attaining a target sprung-mass state) (the computation being made by the skyhook control unit 201), and to control the brake 20 based on the brake attitude control amount.

In other words, by performing vehicle attitude control not only by the engine 1 but also by the brake 20, the attitude of the vehicle can be controlled more reliably. In addition, the vertical acceleration sensor 15 of high phase velocity is used for the feedback control system of the engine 1 having lower responsiveness than the brake 20 and the S/A 3, while the stroke sensor 14 of low phase velocity is used for the feedback systems of the brake 20 and the S/A 3 having higher responsiveness than the engine 1. Thus, balance in responsiveness among the feedback control systems is attained to improve overall control stability of the vehicle.

The vehicle attitude is controlled through the skyhook control in Embodiment 1, but may be controlled using different vehicle attitude control. Moreover, the brake 20 controls a pitch rate in Embodiment 1, but may control a bounce rate or the like. Further, a target attitude is a level attitude in Embodiment 1, but may be such an attitude that the nose of the vehicle body is somewhat sinking, in order to secure the vision of the driver making a turn, for example. Instead of the sprung-mass attitude, the unsprung-mass vibration suppression may be controlled.

(2) The vehicle controlling apparatus further comprises the phase compensator 500 configured to compensate for a phase offset between the detection value obtained by the acceleration sensor 15 and the detection value obtained by the stroke sensor 14. Thereby, with the above responsiveness balance and further the phase compensation in the feedback control systems, the overall system is stabilized.

(3) The sprung-mass vibration suppression control unit 101*a* (power-source attitude controller) suppresses a bounce motion and a pitch motion of a vehicle body.

Thus, the damping force control amount for the S/A 3 can be reduced, which can contribute to avoiding lowering the high-frequency vibration characteristics. Further, since the S/A 3 can focus on suppressing the roll motion, the roll motion can be suppressed effectively.

(4) The engine attitude controller 101 (power-source attitude controller) has a limit value used to limit the power-source attitude control amount to a predetermined value range. In other words, the engine torque control amount is limited so that a longitudinal acceleration converted from the engine torque control amount may fall within a predetermined range. Specifically, when the engine attitude control amount (engine torque control amount) computed based on FB and FP is at or above the limit value, an engine attitude control amount outputted is a skyhook control amount for the bounce rate and the pitch rate obtainable with the limit value. Thus, the vehicle attitude can be controlled without causing discomfort to the occupant.

(5) The skyhook control unit 201 (friction-brake attitude controller) suppresses a pitch motion of a vehicle body.

Generally, since both the bounce and pitch are controllable by the brake 20, it might be preferable that both of them be controlled. Nonetheless, the present invention adopts a configuration in which the brake 20 prioritize suppression of a pitch motion over suppression of a bounce motion, and in Embodiment 1 in particular, the brake 20 focuses on the pitch control, because the bounce control has the following tendency. Specifically, the bounce control for the brakes 20 causes all the brakes 20 for the four wheels to generate a braking force at the same time. For this reason, despite that the control in the bounce direction is a low-priority control and that control effect is hard to attain, a deceleration feel experienced by the driver is strong, which is likely to cause driver discomfort. Since the present invention prioritizes the pitch control, the deceleration feel can be suppressed to mitigate discomfort experienced by the occupant.

In Embodiment 1, when the pitch rate Vp is positive, i.e., the front-wheel side is sinking, no braking force is given. This is because, in this case, a braking force would cause the front-wheel side to sink further, promoting the pitch motion. On the other hand, when the pitch rate Vp is negative, i.e., the front-wheel side is lifted, a braking force is given by a braking pitch moment to suppress the lifting of the front-wheel side. Thereby, the field of view of the driver is secured to make it easier to see ahead, which contributes to improvement in a sense of security and a sense of being level. Since a braking torque is generated only when the front side of the vehicle is lifted, compared to a case of generating a braking torque also when the front side of the vehicle is sinking, a generated deceleration can be decreased. Moreover, since the frequency of actuating the actuator can be reduced in half, a low-cost actuator can be used.

Although only the pitch control is performed in Embodiment 1, both of the pitch control and the bounce control may be performed in such a way that suppression of the pitch motion is preferentially performed, or that a control amount for the bounce motion is multiplied by a gain to decrease the control amount. This is because the objective of the present invention is accomplished as long as the bounce control is prioritized over the pitch control.

Further, although the skyhook control is used for the pitch control, a different control algorithm may be used as long as a braking torque for suppressing a pitch rate is outputted.

(6) The skyhook control unit 201 (friction-brake attitude controller) has a limit value used to limit the brake attitude control amount to a predetermined value so that a rate of change of a vehicle-body deceleration does not exceed a predetermined value.

Specifically, the jerk threshold limitation unit 3342*d* determines whether or not the rate of change of the calculated target deceleration, namely jerk, does not exceed a preset deceleration jerk threshold and a preset acceleration jerk threshold and whether or not the target deceleration does not exceed a limit value for the longitudinal acceleration. If the rate of change exceeds any of the jerk thresholds, the target deceleration is corrected to a value not to exceed the jerk thresholds. If the target deceleration exceeds the limit value, it is set not to exceed the limit value. Thereby, generation of a deceleration which causes driver discomfort can be avoided.

(7) The vehicle controlling apparatus further comprises the S/A controller 3*a* (damping-force controller) configured to compute a control amount for a damping force of the S/A 3 (damping-force-variable shock absorber), the control amount making the stroke speed detected by the stroke sensor 14 an appropriate stroke speed for attaining at least one of a target sprung-mass state and a target unsprung-mass state, and to control the S/A 3 based on the damping force control amount.

Thus, the control amount for the damping force of the S/A 3 can be reduced by the engine 1 and the brake 20, which are actuators having nothing to do with lowering the high-frequency vibration characteristics, and therefore the vehicle attitude can be stabilized while lowering of the high-frequency vibrations is avoided. Moreover, since the control amount for the damping force can be reduced by the engine 1 and the brake 20, the controllable region of the S/A 3 can be made relatively small, which allows the vehicle attitude control to be accomplished with an inexpensive configuration.

In addition, the vertical acceleration sensor 15 of high phase velocity is used for the feedback control system of the engine 1 having lower responsiveness than the S/A 3, while the stroke sensor 14 of low phase velocity is used for the feedback systems of the S/A 3 having higher responsiveness than the engine 1. Thus, balance in responsiveness among the feedback control systems is attained to improve overall control stability of the vehicle.

(8) The third traveling-state estimator 32 (damping-force controller) computes the damping force control amount based on an active skyhook model capable of estimation not dependent on signs of a speed of the sprung mass and the stroke speed.

As a result, the filter responsiveness becomes stable, and appropriate estimation accuracy can be obtained. Here, although the active skyhook model is adopted, only semi-active control is actually possible, halving the controllable range. Thus, the estimated sprung-mass speed becomes smaller than the actual speed in a frequency band lower than a sprung-mass resonance. However, the most important in the skyhook control is the phase, and as long as the phase-sign relation is maintained, the skyhook control can be accomplished. Further, the sprung-mass speed is adjustable by other coefficients and the like. Hence, this is not problematic.

(9) The third traveling-state estimator 32 (damping-force controller) estimates a traveling state using a four-wheel model developed based on a bounce term representing a vertical motion of four wheels, a pitch term representing a vertical motion of the front wheels and of the rear wheels, a roll term representing a vertical motion of the left wheels and of the right wheels, and a warp term representing a vertical motion of each pair of diagonal wheels.

When the state of the sprung mass is estimated by mode decomposition into a roll rate, a pitch rate, and a bounce rate, using the stroke speeds of the wheels, one corresponding component is missing, which makes the solution is indeterminate. Accordingly, a warp rate indicating a motion of diagonal wheels is added to allow the estimation of the above terms.

(10) A vehicle controlling apparatus comprises: the vertical acceleration sensor 15 configured to detect a vertical acceleration of a sprung mass; the stroke sensor 14 configured to detect a stroke speed of the S/A 3; and the engine controller 1a and the brake controller 2a (controller) configured to compute an engine attitude control amount for making a sprung-mass state estimated by the first traveling-state estimator 100 based on the acceleration detected by the vertical acceleration sensor 15 a stable sprung-mass state (an appropriate acceleration for attaining a target sprung-mass state) (the computation being made by the engine attitude controller 101) and to request the engine 1 to output a driving force based on the engine attitude control amount, and also configured to compute a brake attitude control amount for making at least one of a sprung-mass state and an unsprung-mass state estimated by the second-running state estimator 200 based on the stroke speed detected by the stroke sensor a target sprung-mass state or a target unsprung-mass state and to request the brake 20 to output a braking force based on the brake attitude control amount.

In other words, by performing vehicle attitude control not only by the engine 1 but also by the brake 20, the attitude of the vehicle can be controlled more reliably. In addition, the vertical acceleration sensor 15 of high phase velocity is used for the feedback control system of the engine 1 having lower responsiveness than the brake 20 and the S/A 3, while the stroke sensor 14 of low phase velocity is used for the feedback systems of the brake 20 and the S/A 3 having higher responsiveness than the engine 1. Thus, balance in responsiveness among the feedback control systems is attained to improve overall control stability of the vehicle.

(11) The engine controller 1a (controller) computes a power-source attitude control amount for a driving force outputted from the engine 1, the control amount making a vertical acceleration of a sprung mass an appropriate sprung-mass vertical acceleration for attaining a target sprung-mass state, and controls the driving force of the engine 1 based on the power-source attitude control amount, and the brake controller 2a (controller) computes a brake attitude control amount for a braking force of the brake, the control amount making a stroke speed of the S/A 3 an appropriate stroke speed for attaining at least one of a target sprung-mass state and a target unsprung-mass state, and controls the braking force of the brake 20 based on the brake attitude control amount.

In other words, by performing vehicle attitude control not only by the engine 1 but also by the brake 20, the attitude of the vehicle can be controlled more reliably. In addition, the vertical acceleration sensor 15 of high phase velocity is used for the feedback control system of the engine 1 having lower responsiveness than the brake 20 and the S/A 3, while the stroke sensor 14 of low phase velocity is used for the feedback systems of the brake 20 and the S/A 3 having higher responsiveness than the engine 1. Thus, balance in responsiveness among the feedback control systems is attained to improve overall control stability of the vehicle.

[Embodiment 2]

In Embodiment 1, as shown in FIG. 3, the feedback control system of the engine 1 uses the vertical acceleration sensors 15, while that of the brakes 20 and the S/As 3 uses the stroke sensors 14.

Figure 22:
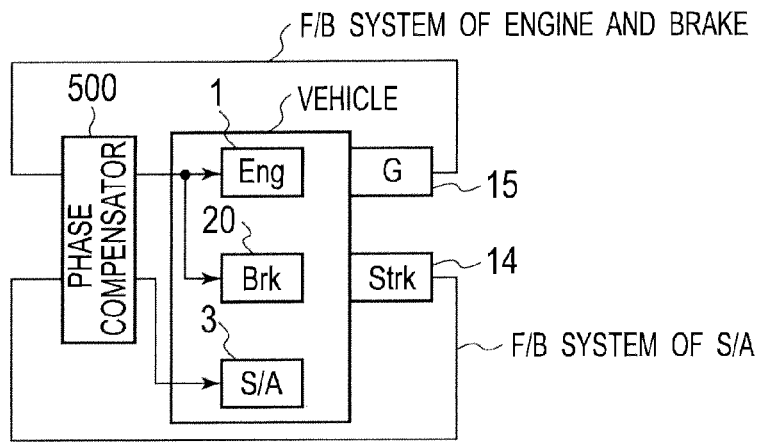
FIG. 22 is a conceptual diagram illustrating the configuration of feedback control systems of Embodiment 2.

In contrast, in Embodiment 2, as shown in FIG. 22, the feedback control system of the engine 1 and the brakes 20 uses the vertical acceleration sensors 15, while that of the S/As 3 uses the stroke sensors 14. More specifically, in Embodiment 2, the feedback control system of the engine controller 1a and the brake controller 2a uses the vertical acceleration sensors 15, while that of the S/A controller 3a uses the stroke sensors 14.

In Embodiment 2, it is assumed that, compared to the S/As 3, the engine 1 and the brakes 20 have low responsiveness to control instructions, from receiving them to actually changing the torque. In such a case, sensors having high phase velocity, such as the vertical acceleration sensors 15, are used to detect the sprung-mass state so that the control instructions may be outputted to the engine 1 and the brakes 20 faster. On the other hand, if the feedback control system of the S/As 3 having higher responsiveness than the engine 1 and the brakes 20 uses the vertical acceleration sensors 15, the control balance between the S/As 3 and these other actuators might be disrupted. For this reason, the sprung-mass state is detected using the stroke sensors 14 having lower phase velocity than the vertical acceleration sensors 15.

Thus, in Embodiment 2, in the estimation processing, the second traveling-state estimator 200 shown in FIG. 2 calculates a pitch rate from the difference between the vertical acceleration at the front part and the vertical acceleration at the rear part based on the side view model, like the first traveling-state estimator 100 does. However, the present invention is not particularly limited to this, and the estimation may be carried out using other models.

Except for the point described above, the vehicle controlling apparatus and method according to Embodiment 2 have the same configurations and operations as those of Embodiment 1. Hence, descriptions and drawings therefor are omitted here.

Embodiment 2 described above offers advantageous effects listed below.

(13) A vehicle controlling apparatus comprises: the vertical acceleration sensor 15 configured to detect a vertical acceleration of a sprung mass; the engine controller 1a (power-source attitude controller) configured to compute a power-source attitude control amount for a driving force outputted from the engine 1 (a power source) (the computation being made by the engine attitude controller 101), the control amount making a sprung-mass state estimated by the first traveling-state estimator 100 based on the acceleration detected by the vertical acceleration sensor 15 a stable sprung-mass state (an appropriate acceleration for attaining a target sprung-mass state), and to control the engine 1 based on the power-source attitude control amount; the stroke sensor 14 configured to detect a stroke speed of the S/A 3 (a damping-force-variable shock absorber); and the S/A controller 3a (damping-force controller) configured to compute a control amount for a damping force of the S/A 3 (damping-force-variable shock absorber), the control amount making the stroke speed detected by the stroke sensor 14 an appropriate stroke speed for attaining at least one of a target sprung-mass state and a target unsprung-mass state, and to control the S/A 3 based on the damping force control amount.

Thus, the control amount for the damping force of the S/A 3 can be reduced by the engine 1, which is an actuator having nothing to do with lowering the high-frequency vibration characteristics, and therefore lowering of the high-frequency vibration characteristics is avoided. Moreover, since the control amount for the damping force can be reduced by the engine 1, the controllable region of the S/A 3 can be made relatively small, which allows the vehicle attitude control to be accomplished with an inexpensive configuration.

Compared to the S/A 3, the engine 1 has low responsiveness to control instructions, from receiving them to actually changing the torque. In such a case, a sensor having high phase velocity, such as the vertical acceleration sensor 15, is used to detect the sprung-mass state so that the control instructions may be outputted to the engine 1 faster. On the other hand, if the feedback control system of the S/A 3 having higher responsiveness than the engine 1 uses the vertical acceleration sensor 15, the control balance between the S/A 3 and the engine side might be disrupted. For this reason, the sprung-mass state is detected using the stroke sensor 14 having lower phase velocity than the vertical acceleration sensor 15. In sum, the vertical acceleration sensor 15 of high phase velocity is used for the feedback control system of the engine 1 having lower responsiveness than the S/A 3, while the stroke sensor 14 of low phase velocity is used for the feedback system of the S/A 3 having higher responsiveness than the engine 1. The balance in responsiveness among the feedback control systems can thus be attained to improve overall control stability of the vehicle.

The vehicle attitude is controlled through the skyhook control in Embodiment 2, but may be controlled using different vehicle attitude control. Moreover, the engine 1 controls a bounce rate and a pitch rate in Embodiment 2, but may control only a pitch rate. Further, a target attitude is a level attitude in Embodiment 2, but may be such an attitude that the nose of the vehicle body is somewhat sinking, in order to secure the vision of the driver making a turn, for example. Instead of the sprung-mass attitude, the unsprung-mass vibration suppression may be controlled.

(14) The vehicle controlling apparatus further comprises the phase compensator 500 configured to compensate for a phase offset between the detection value obtained by the acceleration sensor 15 and the detection value obtained by the stroke sensor 14. Thereby, with the above responsiveness balance and further the phase compensation in the feedback control systems, the overall system is stabilized.

(15) The sprung-mass vibration suppression control unit 101a (power-source attitude controller) suppresses a bounce motion and a pitch motion of a vehicle body.

Thus, the damping force control amount for the S/A 3 can be reduced, which can contribute to avoiding lowering the high-frequency vibration characteristics. Further, since the S/A 3 can focus on suppressing the roll motion, the roll motion can be suppressed effectively.

(16) The engine attitude controller 101 (power-source attitude controller) has a limit value used to limit the power-source attitude control amount to a predetermined value range. In other words, the engine torque control amount is limited so that a longitudinal acceleration converted from the engine torque control amount may fall within a predetermined range. Specifically, when the engine attitude control amount (engine torque control amount) computed based on FB and FP is at or above the limit value, an engine attitude control amount outputted is a skyhook control amount for the bounce rate and the pitch rate obtainable with the limit value. Thus, the vehicle attitude can be controlled without causing discomfort to the occupant.

(17) The vehicle controlling apparatus further comprises the brake controller 2a (friction-brake attitude controller) configured to compute a brake attitude control amount for a braking force outputted from the brake 20 (a friction brake), the control amount making a sprung-mass state estimated by the second traveling-state estimator 200 based on the stroke speed detected by the stroke sensor 14 a stable sprung-mass state (an appropriate stroke speed for attaining a target sprung-mass state) (the computation being made by the skyhook control unit 201), and to control the brake 20 based on the brake attitude control amount.

Thus, the control amount for the damping force of the S/A 3 can be reduced by the brake 20, which is an actuator having nothing to do with lowering high-frequency vibration characteristics, and therefore lowering of the high-frequency vibration characteristics is avoided. Moreover, since the control amount for the damping force can be reduced by the brake 20, the controllable region of the S/A 3 can be made relatively small, which allows the vehicle attitude control to be accomplished with an inexpensive configuration.

Compared to the S/A 3, the brake 20 has low responsiveness to control instructions, from receiving them to actually changing the torque. In such a case, a sensor having high phase velocity, such as the vertical acceleration sensor 15, is used to detect the sprung-mass state so that the control instructions may be outputted to the brake 20 faster. On the other hand, if the feedback control system of the S/A 3 having higher responsiveness than the brake 20 uses the vertical acceleration sensor 15, the control balance between the S/A 3 and the brake side might be disrupted. For this reason, the sprung-mass state is detected using the stroke sensor 14 having lower phase velocity than the vertical acceleration sensor 15. In sum, the vertical acceleration sensor 15 of high phase velocity is used for the feedback control system of the brake 20 having lower responsiveness than the S/A 3, while the stroke sensor 14 of low phase velocity is used for the feedback system of the S/A 3 having higher responsiveness than the brake 20. The balance in responsiveness among the feedback control systems can thus be attained to improve overall control stability of the vehicle.

(18) The skyhook control unit 201 (friction-brake attitude controller) suppresses a pitch motion of a vehicle body.

Generally, since both the bounce and pitch are controllable by the brake 20, it might be preferable that both of them be controlled. Nonetheless, the present invention adopts a configuration in which the brake 20 prioritize suppression of a pitch motion over suppression of a bounce motion, and in Embodiment 2 in particular, the brake 20 focuses on the pitch control, because the bounce control has the following tendency. Specifically, the bounce control for the brakes 20 causes all the brakes 20 for the four wheels to generate a braking force at the same time. For this reason, despite that the control in the bounce direction is a low-priority control and that control effect is hard to attain, a deceleration feel experienced by the driver is strong, which is likely to cause driver discomfort. Since the present invention prioritizes the pitch control, the deceleration feel can be suppressed to mitigate discomfort experienced by the occupant.

In Embodiment 2, when the pitch rate Vp is positive, i.e., the front-wheel side is sinking, no braking force is given. This is because, in this case, a braking force would cause the front-wheel side to sink further, promoting the pitch motion. On the other hand, when the pitch rate Vp is negative, i.e., the front-wheel side is lifted, a braking force is given by a braking pitch moment to suppress the lifting of the front-wheel side. Thereby, the field of view of the driver is secured to make it easier to see ahead, which contributes to improvement in a sense of security and a sense of being level. Since a braking torque is generated only when the front side of the vehicle is lifted, compared to a case of generating a braking torque also when the front side of the vehicle is sinking, a generated deceleration can be decreased. Moreover, since the frequency of actuating the actuator can be reduced in half, a low-cost actuator can be used.

(19) The skyhook control unit 201 (friction-brake attitude controller) has a limit value used to limit the brake attitude control amount to a predetermined value so that a rate of change of a vehicle-body deceleration does not exceed a predetermined value.

Specifically, the jerk threshold limitation unit 3342$d$ determines whether or not the rate of change of the calculated target deceleration, namely jerk, does not exceed a preset deceleration jerk threshold and a preset acceleration jerk threshold and whether or not the target deceleration does not exceed a limit value for the longitudinal acceleration. If the rate of change exceeds any of the jerk thresholds, the target deceleration is corrected to a value not to exceed the jerk thresholds. If the target deceleration exceeds the limit value, it is set not to exceed the limit value. Thereby, generation of a deceleration which causes driver discomfort can be avoided.

(20) The third traveling-state estimator 32 (damping-force controller) computes the damping force control amount based on an active skyhook model capable of estimation not dependent on signs of a speed of the sprung mass and the stroke speed. As a result, the filter responsiveness becomes stable, and appropriate estimation accuracy can be obtained.

(21) The third traveling-state estimator 32 (damping-force controller) estimates a traveling state using a four-wheel model developed based on a bounce term representing a vertical motion of four wheels, a pitch term representing a vertical motion of the front wheels and of the rear wheels, a roll term representing a vertical motion of the left wheels and of the right wheels, and a warp term representing a vertical motion of each pair of diagonal wheels.

When the state of the sprung mass is estimated by mode decomposition into a roll rate, a pitch rate, and a bounce rate, using the stroke speeds of the wheels, one corresponding component is missing, which makes the solution is indeterminate. Accordingly, a warp rate indicating a motion of diagonal wheels is added to allow the estimation of the above terms.

(22) A vehicle controlling apparatus comprises: the vertical acceleration sensor 15 configured to detect a vertical acceleration of a sprung mass; the stroke sensor 14 configured to detect a stroke speed of the S/A 3; and the engine controller 1$a$ and the S/A controller 3$a$ (controller) configured to compute an engine attitude control amount for making a sprung-mass state estimated by the first traveling-state estimator 100 based on the acceleration detected by the vertical acceleration sensor 15 a stable sprung-mass state (an appropriate acceleration for attaining a target sprung-mass state) (the computation being made by the engine attitude controller 101) and to request the engine 1 to output a driving force based on the engine attitude control amount, and also configured to compute a control amount for a damping force of the S/A 3 for making at least one of a sprung-mass state and an unsprung-mass state estimated by the third-running state estimator 32 based on the stroke speed detected by the stroke sensor a target sprung-mass state or a target unsprung-mass state and to request the S/A 3 to output a damping force based on the damping force control amount.

Thus, the control amount for the damping force of the S/A 3 can be reduced by the engine 1, which is an actuator having nothing to do with lowering the high-frequency vibration characteristics, and therefore lowering of the high-frequency vibration characteristics is avoided. Moreover, since the control amount for the damping force can be reduced by the engine 1, the controllable region of the S/A 3 can be made relatively small, which allows the vehicle attitude control to be accomplished with an inexpensive configuration.

Moreover, the vertical acceleration sensor 15 of high phase velocity is used for the feedback control system of the engine 1 having lower responsiveness than the S/A 3, while the stroke sensor 14 of low phase velocity is used for the feedback system of the S/A 3 having higher responsiveness than the engine 1. The balance in responsiveness among the feedback control systems can thus be attained to improve overall control stability of the vehicle.

(23) The engine controller 1$a$ (controller) computes a power-source attitude control amount for a driving force outputted from the engine 1, the control amount making a vertical acceleration of a sprung mass an appropriate sprung-mass vertical acceleration for attaining a target sprung-mass state, and controls the driving force of the engine 1 based on the power-source attitude control amount, and the S/A controller 3$a$ (controller) computes an S/A attitude control amount for making a stroke speed of the S/A 3 an appropriate stroke speed for attaining at least one of a target sprung-mass state and a target unsprung-mass state, and controls a damping force of the S/A 3 based on the S/A attitude control amount.

Thus, the control amount for the damping force of the S/A 3 can be reduced by the engine 1, which is an actuator having nothing to do with lowering the high-frequency vibration characteristics, and therefore lowering of the high-frequency vibration characteristics is avoided. Moreover, since the control amount for the damping force can be reduced by the engine 1, the controllable region of the S/A 3 can be made relatively small, which allows the vehicle attitude control to be accomplished with an inexpensive configuration.

Moreover, the vertical acceleration sensor 15 of high phase velocity is used for the feedback control system of the engine 1 having lower responsiveness than the S/A 3, while the stroke sensor 14 of low phase velocity is used for the feedback system of the S/A 3 having higher responsiveness than the engine 1. The balance in responsiveness among the feedback control systems can thus be attained to improve overall control stability of the vehicle.

[Embodiment 3]

Similar to Embodiments 1 and 2, a vehicle controlling apparatus of Embodiment 3 uses three types of actuators (the engine 1, the brakes 20, and the S/As 3) to control the vibrations of the sprung mass.

In Embodiments 1 and 2, a feedback control system using the vertical acceleration sensors 15 and a feedback control system using the stroke sensors 14 are used in combination for these actuators (see FIGS. 3 and 22).

Figure 23:
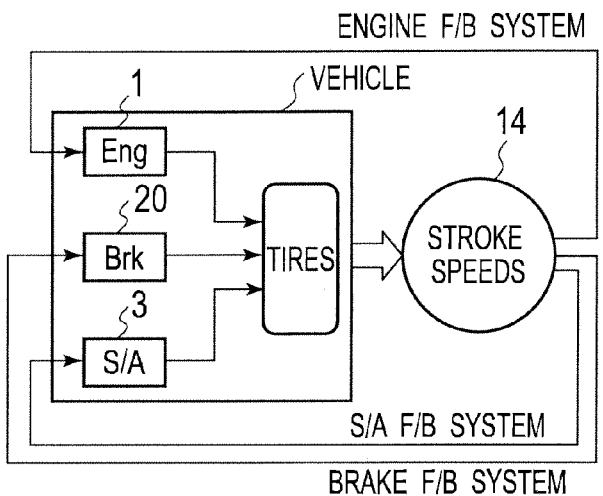
FIG. 23 is a conceptual diagram illustrating the configuration of feedback control systems of Embodiment 3.

In contrast, in Embodiment 3, all the actuators (the engine 1, the brakes 20, and the S/As 3) have a feedback control system using the stroke sensors 14. FIG. 23 is a conceptual diagram illustrating the configuration of the feedback control systems in Embodiment 3. The engine 1, the brakes 20, and the S/As 3 have an engine feedback control system, a brake feedback control system, and an S/A feedback control system, respectively. In this case, when these actuators are operated individually without monitoring each other's actuation statuses, control interference is problematic. However, the influence on each actuator by the other actuators appears as stroke speeds. Thus, configuring the feedback control systems based on the stroke speeds results in monitoring each other's influence, and therefore avoids control interference. For example, if certain sprung-mass vibrations are suppressed by the engine 1, the other actuators, namely the brakes 20 and the S/As 3, do not perceive the content of the control performed by the engine 1, but perform their control using the stroke speeds changed by the control by the engine 1. In other words, the feedback control systems of the three actuators use common values, namely the stroke speeds. For this reason, even if they perform their control individually without monitoring each other's control, as a result the control is performed as if they were monitoring (this control is called emphasis control below). Thus, the attitude of the vehicle can be stabilized.

In addition, in Embodiment 3, all the actuators perform the skyhook control. All of the actuators perform their skyhook control based on the feedback control system using the stroke sensors 14.

Specifically, as shown in FIG. 2, the vehicle controlling apparatus of Embodiment 3 includes, as its controller, the engine controller 1a, the brake controller 2a, and the S/A controller 3a, and each of these controllers has a feedback control system using the stroke sensors 14. Consequently, Embodiment 3 does not need the vertical acceleration sensors 15 (15FR, 15FL, 15RR, and 15RL) shown in FIG. 1.

The engine controller 1a performs the feedback control based mainly on stroke speeds detected by the stroke sensors 14. Based on the stroke speeds of the four wheels, the first traveling-state estimator 100 estimates a bounce rate, a roll rate, and a pitch rate used for the skyhook control performed by the sprung-mass vibration suppression control unit 101a. Note that the first traveling-state estimator 100, the second traveling-state estimator 200, and the third traveling-state estimator 32 perform the same estimation processing. As a representative example, the estimation processing performed by the third traveling-state estimator 32 is described. The estimation processing by the third traveling-state estimator is not particular limited as long as it uses stroke speeds.

Figure 24:
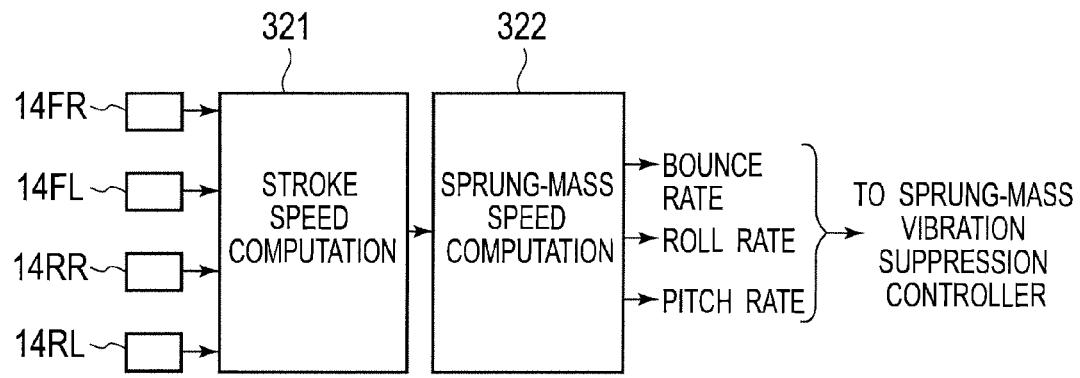
FIG. 24 is a control block diagram illustrating the configuration of a traveling-state estimator of Embodiment 3.

FIG. 24 is a control block diagram illustrating the configuration of the third traveling-state estimator 32 of Embodiment 3. Based basically on stroke speeds detected by the stroke sensors 14, the third traveling-state estimator 32 of Embodiment 3 calculates the bounce rate, roll rate, and pitch rate of the wheels used for the skyhook control by the sprung-mass vibration suppression control unit 33 to be described later. Specifically, values obtained by the stroke sensors 14 for the respective wheels are first inputted to a stroke speed computer 321, which then computes stroke speeds Vz_s of the wheels based on the inputted values. The sprung-mass speeds are computed based on the stroke speeds Vz_s.

Based on the stroke speeds Vz_sFL, Vz_sFR, Vz_sRL, and Vz_sRR of the respective wheels calculated by the stroke speed computer 321, the sprung-mass speed computer 322 computes a bounce rate, a roll rate, and a pitch rate used for the skyhook control.

The other configurations and operations of the first to third traveling-state estimators 100, 200, and 32 of Embodiment 3 are the same as those of the third traveling-state estimator 32 of Embodiment 1, and therefore descriptions and drawings therefor are omitted here.

Except for the point described above, configurations and operations of the vehicle controlling apparatus and method are the same as those described in Embodiment 1. Hence, descriptions and drawings therefor are omitted here.

Embodiment 3 described above offers advantageous effects listed below.

(25) A vehicle controlling apparatus comprises: the engine 1, the brake 20, and the S/A 3 (a plurality of actuators) configured to perform vibration suppression control of a sprung mass; the stroke sensor 14 configured to detect a stroke speed of the S/A 3; and the engine controller 1a, the brake controller 2b, and the S/A controller 3a (a plurality of actuator attitude controllers) configured to control corresponding actuators so that a sprung-mass state (estimated by the first traveling-state estimator 100, the second traveling-state estimator 200, and the third traveling-state estimator 32 based on a stroke speed) detected by the stroke sensor 14 becomes (an appropriate stroke speed for attaining) a target sprung-mass state.

In this way, the feedback control systems for these actuators use common values, namely the stroke speeds. For this reason, even if they perform their control individually without monitoring each other's control, emphasis control is performed as a result to stabilize the attitude of the vehicle. To be more specific, when the multiple actuators are operated individually without monitoring each other's actuation statuses, control interference is problematic. However, since their feedback control systems are all based on the stroke speed, the influence on each actuator by the other actuators appears as a stroke speed, which results in monitoring each other's influence and therefore avoids control interference. For example, if certain sprung-mass vibrations are suppressed by the engine 1, a stroke speed is changed accordingly. Then, the other actuators, namely the brakes 20 and the S/As 3, do not perceive the content of the control performed by the engine 1, but perform their control using the stroke speed changed by the control by the engine 1.

(26) The plurality of actuators are the engine 1, the brake 20, and the S/A 3, and the plurality of actuator controllers are the engine controller 1a (power-source attitude controller), the brake controller 2a (brake attitude controller), and the S/A controller 3a (damping-force controller).

In performing the sprung-mass vibration suppression control, assume for example that only the S/A 3, which has a high ability of controlling the attitude of the sprung mass, is used, instead of employing emphasis control by multiple actuators. In such a case, a large damping force is needed to suppress a slow motion of the sprung mass. However, a large damping force increases vibration transmissibility. Consequently, when high-frequency vibrations are generated due to small bumps and recesses of the road surface, a ride quality might be lowered, i.e., the high-frequency vibration characteristics might be lowered. To avoid that, by causing the engine 1 and the brake 20, which are actuators having nothing to do with degrading the high-frequency vibration characteristics, to reduce the control amount for the damping force of the S/A 3, the transmissibility of vibration to the sprung mass can be reduced to avoid the lowering of the high-frequency vibration characteristics. Moreover, since the control amount for the damping force can be reduced by the engine 1 and the brake 20, the controllable region of the S/A 3 can be made relatively small, which allows the vehicle attitude control to be accomplished with an inexpensive configuration.

(27) The power-source attitude controller suppresses a bounce motion and a pitch motion of a vehicle body.

In performing the sprung-mass vibration suppression control, assume for example that only the S/A 3, which has a high ability of controlling the attitude of the sprung mass, is used, instead of employing emphasis control by multiple actuators. In such a case, a large damping force is needed to suppress a slow motion of the sprung mass. However, a large damping force increases vibration transmissibility. Consequently, when high-frequency vibrations are generated due to small bumps and recesses of the road surface, a ride quality might be lowered, i.e., high-frequency vibration characteristics might be lowered. Thus, the control amount for the damping force of the S/A 3 can be reduced by causing the engine 1, which is an actuator having nothing to do with degrading the high-frequency vibration characteristics, to suppress a bounce motion and a pitch motion of the vehicle body. Thereby, the transmissibility of vibration to the sprung mass can be reduced to avoid the lowering of the high-frequency vibration characteristics. Moreover, since the S/A 3 can focus on suppression of a roll motion, the roll motion can be suppressed effectively.

(28) The engine attitude controller 101 (power-source attitude controller) has a limit value used to limit the power-source attitude control amount to a predetermined value range. In other words, the engine torque control amount is limited so that a longitudinal acceleration converted from the engine torque control amount may fall within a predetermined range. Specifically, when the engine attitude control amount (engine torque control amount) computed based on FB and FP is at or above the limit value, an engine attitude control amount outputted is a skyhook control amount for the bounce rate and the pitch rate obtainable with the limit value. Thus, the vehicle attitude can be controlled without causing discomfort to the occupant.

(29) The skyhook control unit 201 (friction-brake attitude controller) suppresses a pitch motion of a vehicle body.

Generally, since both the bounce and pitch are controllable by the brake 20, it might be preferable that both of them be controlled. Nonetheless, the present invention adopts a configuration in which the brake 20 prioritize suppression of a pitch motion over suppression of a bounce motion, and in Embodiment 3 in particular, the brake 20 focuses on the pitch control, because the bounce control has the following tendency. Specifically, despite that the control in the bounce direction is a low-priority control and that control effect is hard to attain, a deceleration feel experienced by the driver is strong, which is likely to cause driver discomfort. Since the present invention prioritizes the pitch control, the deceleration feel can be suppressed to mitigate discomfort experienced by the occupant.

In Embodiment 3, when the pitch rate Vp is positive, i.e., the front-wheel side is sinking, no braking force is given. This is because, in this case, a braking force would cause the front-wheel side to sink further, promoting the pitch motion. On the other hand, when the pitch rate Vp is negative, i.e., the front-wheel side is lifted, a braking force is given by a braking pitch moment to suppress the lifting of the front-wheel side. Thereby, the field of view of the driver is secured to make it easier to see ahead, which contributes to improvement in a sense of security and a sense of being level. Since a braking torque is generated only when the front side of the vehicle is lifted, compared to a case of generating a braking torque also when the front side of the vehicle is sinking, a generated deceleration can be decreased. Moreover, since the frequency of actuating the actuator can be reduced in half, a low-cost actuator can be used.

(30) The skyhook control unit 201 (brake attitude controller) has a limit value used to limit the brake attitude control amount to a predetermined value so that a rate of change of a vehicle-body deceleration does not exceed a predetermined value.

Specifically, the jerk threshold limitation unit 3342d determines whether or not the rate of change of the calculated target deceleration, namely jerk, does not exceed a preset deceleration jerk threshold and a preset acceleration jerk threshold and whether or not the target deceleration does not exceed a limit value for the longitudinal acceleration. If the rate of change exceeds any of the jerk thresholds, the target deceleration is corrected to a value not to exceed the jerk thresholds. If the target deceleration exceeds the limit value, it is set not to exceed the limit value. Thereby, generation of a deceleration which causes driver discomfort can be avoided.

(31) A vehicle controlling apparatus comprises the stroke sensor 14 and the engine controller 1a, the brake controller 2a, and the S/A controller 3a (controller) configured to control the engine 1, the brake 2, and the S/A 3 (a plurality of actuators) so that a sprung-mass state (estimated by the first traveling-state estimator 100, the second traveling-state estimator 200, and the third traveling-state estimator 32 based on a stroke speed) detected by the stroke sensor 14 becomes (an appropriate stoke speed for attaining) a target sprung-mass state.

In this way, the feedback control systems for these actuators use common values, namely the stroke speeds. For this reason, even if they perform their control individually without monitoring each other's control, emphasis control is performed as a result to stabilize the attitude of the vehicle.

(32) A vehicle controlling method using the stroke sensor 14 and causing the engine controller 1a, the brake controller 2a, and the S/A controller 3a to control the engine 1, the brake 20, and the VA 3 (a plurality of actuators) so that a sprung-mass state (estimated by the first traveling-state estimator 100, the second traveling-state estimator 200, and the third traveling-state estimator 32 based on a stroke speed) detected by the stroke sensor 14 becomes (an appropriate stoke speed for attaining) a target sprung-mass state.

In this way, the feedback control systems for these actuators use common values, namely the stroke speeds. For this reason, even if they perform their control individually without monitoring each other's control, emphasis control is performed as a result to stabilize the attitude of the vehicle.

The present invention has been described above through Embodiments 1 to 3, but is not limited to these embodiments. It is apparent to those skilled in the art that various modifications and improvements are possible.

For example, in Embodiments 1 to 3, three types of actuators are used for performing the sprung-mass vibration suppression control, namely, the engine 1, the brakes 20, and the S/As 3. Instead, the present invention may include only the engine 1 and the brakes 20, or only the engine 1 and the S/As 3, or only the brakes 20 and the S/As 3. No matter what the combination, multiple actuators can work together to achieve stable control.

The present application claims priority from Japanese Patent Application No. P2012-058142 (filed on Mar. 15, 2012), Japanese Patent Application No. P2012-058143 (filed on Mar. 15, 2012), and Japanese Patent Application No. P2012-066457 (filed on Mar. 23, 2012), the entire contents of which are incorporated herein by reference.

What is claimed is:

1. A vehicle controlling apparatus comprising:
   a vertical acceleration sensor configured to detect a vertical acceleration of a sprung mass;
   a power-source attitude controller configured to:
      compute a power-source attitude control amount for a driving force outputted from a power source, the power-source attitude control amount making the vertical acceleration detected by the vertical acceleration sensor an appropriate vertical acceleration for attaining a target sprung-mass state, and
      control the power source based on the power-source attitude control amount;
   a stroke sensor configured to detect a stroke speed of a shock absorber; and
   a friction-brake attitude controller configured to:
      compute a brake attitude control amount for a braking force output from a friction brake, the brake attitude control amount making the stroke speed detected by the stroke sensor an appropriate stroke speed for attaining a target sprung-mass state, and
      control the friction brake based on the brake attitude control amount,
   wherein at least one of an engine feedback system, a brake feedback system, or a shock absorber feedback system includes a phase compensator configured to compensate for a phase offset between a detection value obtained by the vertical acceleration sensor and a detection value obtained by the stroke sensor.

2. The vehicle controlling apparatus according to claim 1, wherein
   the power-source attitude controller is further configured to suppress a bounce motion and a pitch motion of a vehicle body.

3. The vehicle controlling apparatus according to claim 1, wherein
   the power-source attitude controller has a limit value used to limit the power-source attitude control amount to a predetermined value range.

4. The vehicle controlling apparatus according to claim 1, wherein
   the friction-brake attitude controller has a limit value used to limit the brake attitude control amount to a predetermined value range so that a rate of change of a vehicle-body deceleration does not exceed a predetermined value.

5. The vehicle controlling apparatus according to claim 1, further comprising
   a damping-force controller configured to:
      compute a damping force control amount for a damping force of a damping-force-variable shock absorber, the damping force control amount making the stroke speed detected by the stroke sensor an appropriate stroke speed for attaining at least one of a target sprung-mass state and a target unsprung-mass state, and
      control the damping-force-variable shock absorber based on the damping force control amount.

6. The vehicle controlling apparatus according to claim 5, wherein
   the damping-force controller computes the damping force control amount based on an active skyhook model capable of estimation not dependent on signs of a speed of the sprung mass and the stroke speed.

7. The vehicle controlling apparatus according to claim 6, wherein
   the damping-force controller is further configured to estimate a traveling state using a four-wheel model developed based on a bounce term representing a vertical motion of four wheels, a pitch term representing a vertical motion of front wheels and rear wheels, a roll term representing a vertical motion of left wheels and right wheels, and a warp term representing a vertical motion of each pair of diagonal wheels.

8. The vehicle controlling apparatus according to claim 1, wherein
   the friction-brake attitude controller suppresses a pitch motion of a vehicle body.

9. A vehicle controlling apparatus comprising:
   a vertical acceleration sensor configured to detect a vertical acceleration of a sprung mass;
   a stroke sensor configured to detect a stroke speed of a shock absorber; and
   a controller configured to:
      compute a power-source attitude control amount for making the vertical acceleration detected by the vertical acceleration sensor an appropriate vertical acceleration for attaining a target sprung-mass state,
      request a power source to output a driving force based on the power-source attitude control amount,
      compute a brake attitude control amount for making the stroke speed detected by the stroke sensor an appropriate stroke speed for attaining at least one of a target sprung-mass state and a target unsprung-mass state,
      request a friction brake to output a braking force based on the brake attitude control amount, and
      use at least one of an engine feedback system, a brake feedback system, or a shock absorber feedback system to compensate for a phase offset between a detection value obtained by the vertical acceleration sensor and a detection value obtained by the stroke sensor.

10. A vehicle controlling method causing a controller to perform:
   computing a power-source attitude control amount for a driving force output from a power source, the power-source attitude control amount making a vertical acceleration of a sprung mass an appropriate sprung-mass vertical acceleration for attaining a target sprung-mass state,
   controlling the driving force of the power source based on the power-source attitude control amount,
   computing a brake attitude control amount for a braking force of a friction brake, the brake attitude control amount making a stroke speed of a shock absorber an appropriate stroke speed for attaining at least one of a target sprung-mass state and a target unsprung-mass state, and
   controlling the braking force of the friction brake based on the brake attitude control amount, and
   using at least one of an engine feedback system, a brake feedback system, or a shock absorber feedback system to compensate for a phase offset between the vertical acceleration and the stroke speed.

11. A vehicle controlling apparatus comprising:
a vertical acceleration sensor configured to detect a vertical acceleration of a sprung mass;
a power-source attitude controller configured to:
  compute a power-source attitude control amount for a driving force outputted from a power source, the power-source attitude control amount making the vertical acceleration detected by the vertical acceleration sensor an appropriate vertical acceleration for attaining a target sprung-mass state, and
  control the power source based on the power-source attitude control amount;
a stroke sensor configured to detect a stroke speed of a damping-force-variable shock absorber; and
a damping-force controller configured to:
  compute a damping force control amount for a damping force of the damping-force-variable shock absorber, the damping force control amount making the stroke speed detected by the stroke sensor an appropriate stroke speed for attaining at least one of a target sprung-mass state and a target unsprung-mass state, and
  control the damping-force-variable shock absorber based on the damping force control amount,
wherein at least one of an engine feedback system, a brake feedback system, or a shock absorber feedback system includes a phase compensator configured to compensate for a phase offset between a detection value obtained by the vertical acceleration sensor and a detection value obtained by the stroke sensor.

12. The vehicle controlling apparatus according to claim 11, wherein
the power-source attitude controller is further configured to suppress a bounce motion and a pitch motion of a vehicle body.

13. The vehicle controlling apparatus according to claim 11, wherein
the power-source attitude controller has a limit value used to limit the power-source attitude control amount to a predetermined value range.

14. The vehicle controlling apparatus according to claim 11, wherein
the damping-force controller computes the damping force control amount based on an active skyhook model capable of estimation not dependent on signs of a speed of the sprung mass and the stroke speed.

15. The vehicle controlling apparatus according to claim 11, wherein
the damping-force controller is further configured to estimate a traveling state using a four-wheel model based on a bounce term representing a vertical motion of four wheels, a pitch term representing a vertical motion of front wheels and rear wheels, a roll term representing a vertical motion of left wheels and right wheels, and a warp term representing a vertical motion of each pair of diagonal wheels.

16. The vehicle controlling apparatus according to claim 11, further comprising a friction-brake attitude controller configured to compute a brake attitude control amount for a braking force output from a friction brake, the brake attitude control amount making the stroke speed detected by the stroke sensor an appropriate stroke speed for attaining a target sprung-mass state, and to control the friction brake based on the brake attitude control amount.

17. The vehicle controlling apparatus according to claim 16, wherein
the friction-brake attitude controller has a limit value used to limit the brake attitude control amount to a predetermined value range so that a rate of change of a vehicle-body deceleration does not exceed a predetermined value.

18. The vehicle controlling apparatus according to claim 16, wherein
the friction-brake attitude controller suppresses a pitch motion of a vehicle body.

19. A vehicle controlling apparatus comprising:
a vertical acceleration sensor configured to detect a vertical acceleration of a sprung mass;
a stroke sensor configured to detect a stroke speed of a damping-force-variable shock absorber; and
a controller configured to:
  compute a power-source attitude control amount for making the vertical acceleration detected by the vertical acceleration sensor an appropriate vertical acceleration for attaining a target sprung-mass state,
  request a power source to output a driving force based on the power-source attitude control amount,
  compute a damping force control amount for making the stroke speed detected by the stroke sensor an appropriate stroke speed for attaining at least one of a target sprung-mass state and a target unsprung-mass state,
  request the damping-force-variable shock absorber to output a damping force based on the damping force control amount, and
  use at least one of an engine feedback system, a brake feedback system, or a shock absorber feedback system to compensate for a phase offset between a detection value obtained by the vertical acceleration sensor and a detection value obtained by the stroke sensor.

20. A vehicle controlling method causing a controller to perform:
computing a power-source attitude control amount for a driving force output from a power source, the power-source attitude control amount making a vertical acceleration of a sprung mass an appropriate sprung-mass vertical acceleration for attaining a target sprung-mass state,
controlling the driving force of the power source based on the power-source attitude control amount,
computing a damping force control amount for a damping force of a damping-force-variable shock absorber, the damping force control amount making a stroke speed of the damping-force-variable shock absorber an appropriate stroke speed for attaining at least one of a target sprung-mass state and a target unsprung-mass state,
controlling the damping force of the damping-force-variable shock absorber based on the damping force control amount, and
using at least one of an engine feedback system, a brake feedback system, or a shock absorber feedback system to compensate for a phase offset between the vertical acceleration and the stroke speed.

* * * * *